(12) United States Patent
Smith

(10) Patent No.: US 10,174,884 B2
(45) Date of Patent: Jan. 8, 2019

(54) VALVE STEM FOR A COMPRESSIBLE VALVE

(71) Applicant: The Gillette Company, Boston, MA (US)

(72) Inventor: Scott Edward Smith, Cincinnati, OH (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 14/750,269

(22) Filed: Jun. 25, 2015

(65) Prior Publication Data
US 2016/0377231 A1    Dec. 29, 2016

(51) Int. Cl.
*B65D 83/48* (2006.01)
*B65D 83/42* (2006.01)
(Continued)

(52) U.S. Cl.
CPC ............... *F17C 13/04* (2013.01); *B05B 1/30* (2013.01); *B65D 83/206* (2013.01); *B65D 83/44* (2013.01);
(Continued)

(58) Field of Classification Search
CPC . F17C 14/04; F16K 1/30; F16K 31/58; B65D 83/20; B65D 83/32; B65D 83/38; B65D 83/44; B65D 83/46; B65D 83/48; B65D 83/62; B65D 3/206; B65D 3/425; B65D 3/66; B65D 83/206; B65D 83/425; B65D 83/66
(Continued)

(56) References Cited

U.S. PATENT DOCUMENTS 2,831,608 A * 4/1958 Soffer .................... B65D 83/20
                                                  222/182
2,914,224 A * 11/1959 Michel ................... B65D 83/46
                                                  222/402.11
(Continued)

FOREIGN PATENT DOCUMENTS

DE    10161020 A1 * 7/2003    ............. B65D 83/48
FR       2556242      6/1985
(Continued)

OTHER PUBLICATIONS

U.S. Appl. No. 14/750,283, filed Jun. 25, 2015, Scott Edward Smith et al.
(Continued)

*Primary Examiner* — Reinaldo Sanchez-Medina
*Assistant Examiner* — Hailey K Do
(74) *Attorney, Agent, or Firm* — Ronald T. Sia; Kevin C. Johnson

(57) ABSTRACT

A valve stem for a pressurized valve assembly. The valve stem has an open top portion, a closed bottom portion, at least one primary radial opening, and a valve stem longitudinal passageway between the open top portion and the at least one primary radial opening. A conduit extends from the valve stem at an angle relative to the valve stem longitudinal passageway, proximate to the open top portion. The conduit provides a flowpath between the valve stem longitudinal passageway at a conduit first end and a dispensing opening at a conduit second end.

15 Claims, 22 Drawing Sheets

(51) Int. Cl.
*F17C 13/04* (2006.01)
*B65D 83/20* (2006.01)
*B65D 83/44* (2006.01)
*F16K 1/30* (2006.01)
*F16K 31/58* (2006.01)
*B05B 1/30* (2006.01)
*B65D 83/62* (2006.01)
*B65D 83/66* (2006.01)

(52) U.S. Cl.
CPC ............... *B65D 83/48* (2013.01); *F16K 1/30* (2013.01); *F16K 31/58* (2013.01); *B65D 83/425* (2013.01); *B65D 83/62* (2013.01); *B65D 83/66* (2013.01)

(58) Field of Classification Search
USPC ............. 222/153.13, 402.1, 105, 342, 386.5, 222/402.21, 402.22, 402.23, 464.1, 222/402.24, 153.09
See application file for complete search history.

(56) References Cited

U.S. PATENT DOCUMENTS

| | | | | |
|---|---|---|---|---|
| 2,965,270 | A * | 12/1960 | Soffer | B65D 83/46 222/402.22 |
| 2,994,461 | A * | 8/1961 | Michel | B65D 83/46 222/153.11 |
| 3,146,916 | A | 9/1964 | Kronheim | |
| 3,195,569 | A | 9/1965 | Seaquist | |
| 3,292,827 | A * | 12/1966 | Frangos | B65D 83/44 222/402.17 |
| 3,415,426 | A * | 12/1968 | Kleveland | B65D 83/14 222/402.11 |
| 3,674,185 | A | 7/1972 | Evesque | |
| 3,758,007 | A * | 9/1973 | Rosen | B65D 83/46 222/394 |
| 4,008,834 | A * | 2/1977 | Towns | B65D 83/46 222/402.23 |
| 4,165,825 | A * | 8/1979 | Hansen | B65D 83/46 222/402.22 |
| 4,189,069 | A * | 2/1980 | Stoody | B65D 83/62 222/105 |
| 4,441,634 | A | 4/1984 | Meshberg | |
| 4,887,743 | A * | 12/1989 | Blake | B65D 83/48 222/402.1 |
| 4,969,577 | A * | 11/1990 | Werding | B65D 83/14 141/3 |
| 5,040,705 | A * | 8/1991 | Snell | B65D 83/44 222/402.15 |
| 5,323,933 | A * | 6/1994 | Brakarz | G01F 11/028 222/321.2 |
| 5,732,855 | A | 3/1998 | Van der Heijden | |
| 5,927,563 | A * | 7/1999 | Kellner | B65D 83/48 222/402.1 |
| 6,296,155 | B1 * | 10/2001 | Smith | B65D 83/44 222/402.1 |
| 6,629,624 | B2 * | 10/2003 | Stillinger | B65D 47/2025 220/254.7 |
| 6,843,392 | B1 * | 1/2005 | Walker | B65D 83/54 222/402.1 |
| 6,877,643 | B2 * | 4/2005 | Schneider | B65D 83/205 222/153.11 |
| 6,923,342 | B2 * | 8/2005 | Bourque | B65D 83/68 222/136 |
| 7,124,788 | B2 | 10/2006 | Pericard | |
| 7,364,055 | B2 * | 4/2008 | Yquel | B65D 83/44 222/402.21 |
| 7,775,409 | B2 * | 8/2010 | Scheindel | B65D 83/48 222/402.1 |
| 7,832,597 | B2 * | 11/2010 | Scheindel | B65D 83/48 222/399 |
| 7,959,041 | B2 | 6/2011 | Miller et al. | |
| 8,191,801 | B2 * | 6/2012 | Khan | B65D 83/28 239/548 |
| 8,191,802 | B2 * | 6/2012 | Khan | B05B 1/14 239/548 |
| 8,210,400 | B2 * | 7/2012 | Scheindel | B65D 83/48 222/389 |
| 9,132,955 | B2 * | 9/2015 | Smith | B65D 83/48 |
| 9,254,954 | B2 * | 2/2016 | Davideit | B65D 83/48 |
| 9,375,538 | B2 | 6/2016 | Greiner-Perth et al. | |
| 2003/0006252 | A1 | 1/2003 | Henry et al. | |
| 2006/0124671 | A1 * | 6/2006 | Salemme | B65D 83/38 222/402.2 |
| 2006/0243940 | A1 | 11/2006 | De Schrijver | |
| 2008/0230566 | A1 * | 9/2008 | Frutin | B65D 83/46 222/402.15 |
| 2013/0153674 | A1 * | 6/2013 | Stern | B05B 1/02 239/1 |
| 2013/0200111 | A1 * | 8/2013 | De Schrijver | B65D 83/756 222/402.1 |
| 2014/0048567 | A1 | 2/2014 | Dhaenens et al. | |
| 2014/0329918 | A1 * | 11/2014 | Arora | B65D 83/205 514/789 |
| 2015/0004200 | A1 * | 1/2015 | Brown | A61K 8/046 424/401 |
| 2015/0014990 | A1 | 1/2015 | Bodet et al. | |
| 2015/0108387 | A1 * | 4/2015 | Smith | B65D 83/48 251/333 |

FOREIGN PATENT DOCUMENTS

| | | | |
|---|---|---|---|
| GB | 774904 | 5/1957 | |
| GB | 1399586 | 7/1975 | |
| GB | 1449736 | 9/1976 | |
| WO | WO 9842592 A1 * | 10/1998 | B65D 83/48 |
| WO | WO 2013/019683 | 2/2013 | |
| WO | WO 2013131846 A1 * | 9/2013 | B65D 83/32 |

OTHER PUBLICATIONS

U.S. Appl. No. 14/750,294, filed Jun. 25, 2015, Scott Edward Smith et al.

PCT International Search Report with Written Opinion in corresponding Int'l Appln PCT/US2016/039154 dated Sep. 8, 2016.

* cited by examiner

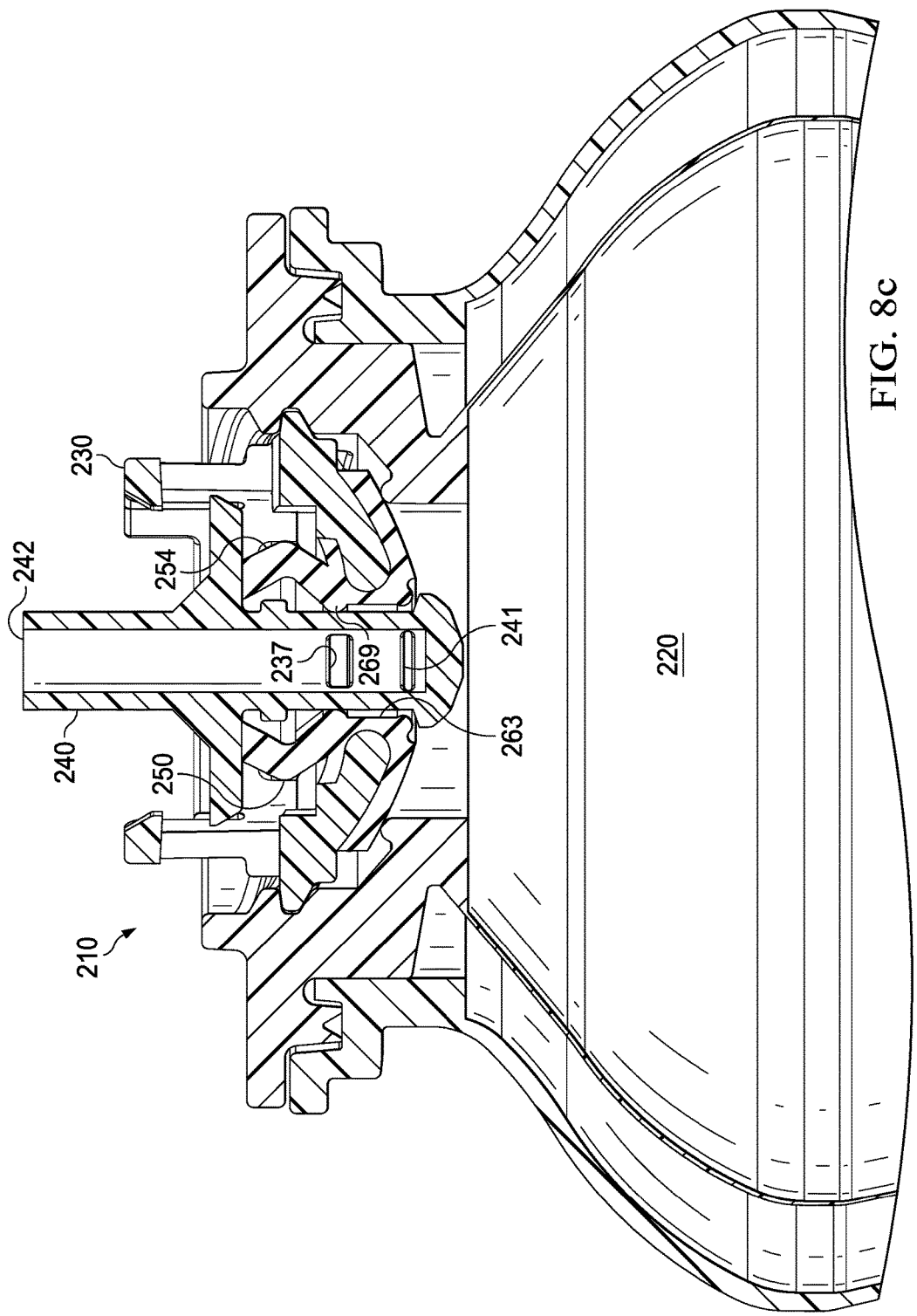

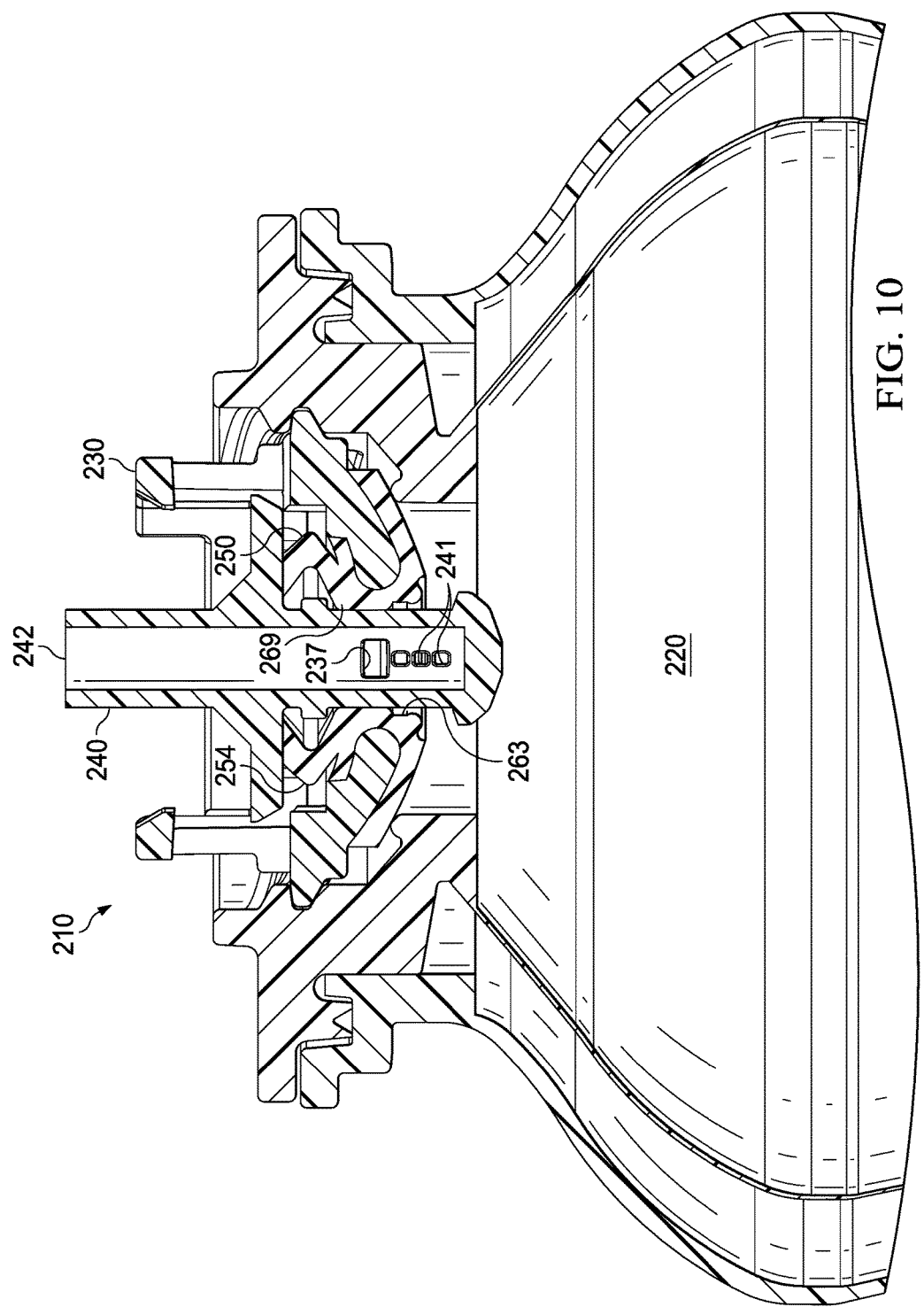

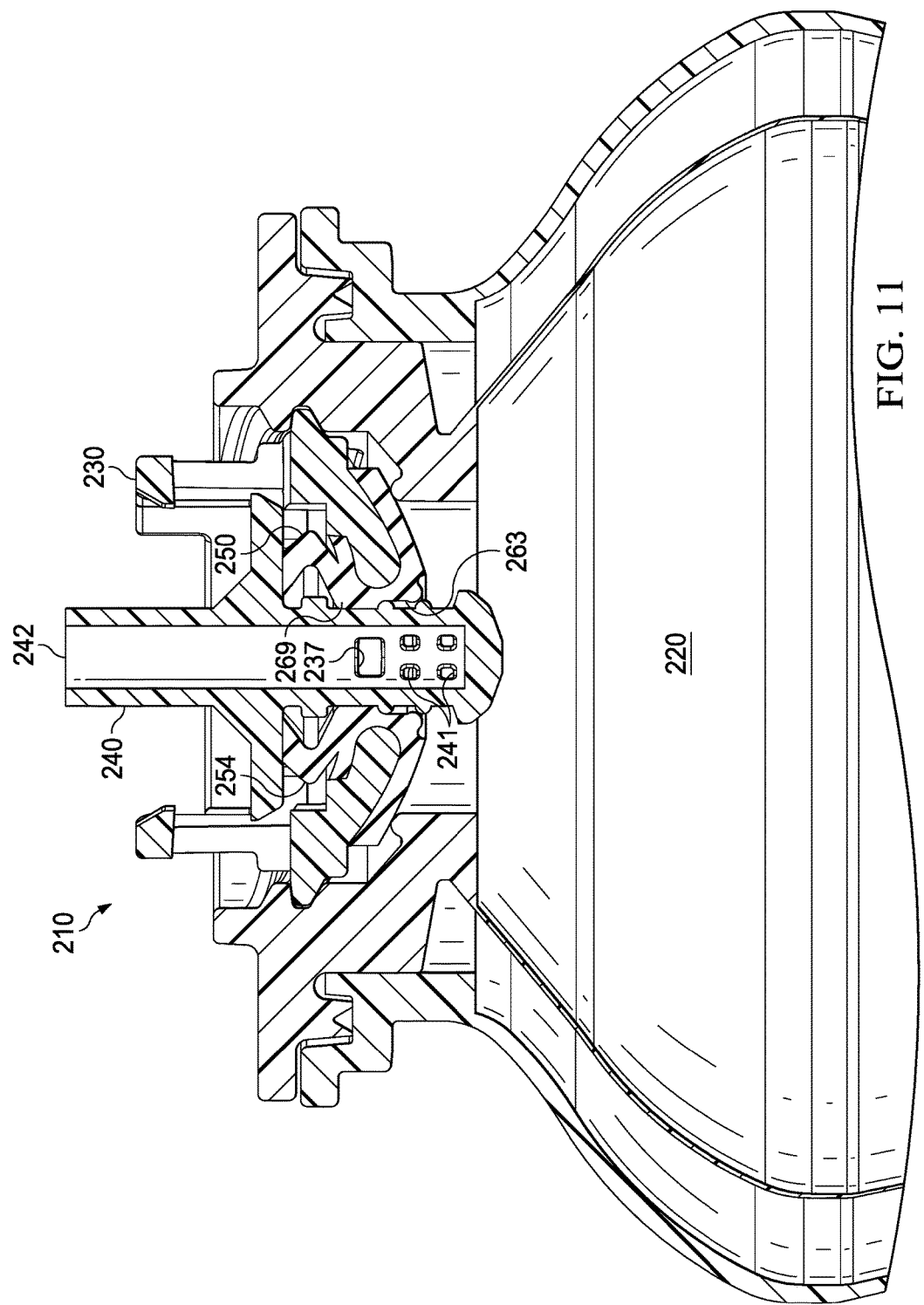

VALVE STEM FOR A COMPRESSIBLE VALVE

FIELD OF THE INVENTION

The present invention relates to a compressible valve for a pressurized container. Particularly, the invention relates to a valve stem for compressible valve for use with a pressurized container for dispensing an aerosol product.

BACKGROUND OF THE INVENTION

The present invention relates to dispensers for aerosols or other pressurized products, and more particularly to a pressure resistant plastic bottle for dispensing an aerosol or other comparably pressurized product.

The term "aerosol" will be understood herein to mean any non-refillable receptacle containing a gas compressed, liquefied or dissolved under pressure, the sole purpose of which is to expel a nonpoisonous (other than a Division 6.1 Packing Group III material) liquid, paste, or powder and fitted with a self-closing release device allowing the contents to be ejected by the gas. Aerosol products include but are not limited to foamed or gel preparations or to liquid products delivered in a non-aerosol stream.

Pressurized containers for dispensing aerosols are well known in the art, and are typically constructed of metal in order to withstand the inherent internal pressure of aerosols. However, it is desirable to provide a plastic container capable of withstanding the internal pressures generated by an aerosol because plastic has many advantages over metal. Some of these advantages include the ease and economy of manufacture, aesthetic appeal to an end user, rust resistance, and the recyclability.

Such pressurized containers have a dispensing nozzle or dispensing orifice to allow the product to be dispensed from the package. The dispensing nozzle or dispensing orifice may be disposed near the top of the package, although other configurations and locations are also known in the art. Dispensing nozzle and dispensing orifice are typically designed to accommodate the product being dispensed (i.e. atomized sprays vs laminar flow gels and fluids). As a result, different valve designs are required to dispense different products. In addition dispensing nozzles are typically spring loaded actuators manufactured from metal in order to provide reliable components such as springs, valve cups and valve stems. Plastic pressurized containers including such valves are typically non recyclable.

Pressurized dispensers may have a variety of configurations, including bag-on-valve, bag-on-can or piston designs. In general, the container of the dispenser is divided by a barrier member into product and propellant chambers. The barrier member may be a bag sealed to the valve assembly, a bag sealed to the container wall, or a piston member slidably disposed within the container. Generally, the product is charged into the product chamber through the valve assembly, whereas the propellant is charged into the propellant chamber through either the valve assembly or a charging orifice provided on the container wall.

Because the valve assembly provides fluid passageways during the filling and dispensing operations of the pressurized dispenser, a valve assembly specifically designed to accommodate optimum efficiency of both operations is highly desirable. For example, increasing product flow through the valve assembly during the filling operation expedites the manufacturing process of the pressurized dispenser. However, the increased product flow may adversely affect the spray characteristics of the dispenser.

Thus, there is a need for a valve assembly that provides an increase flow rate during product filling while retaining a regular flow rate during product dispensing. In addition, there is a need for a universal valve assembly that can accommodate atomized sprays and laminar flow fluids and gels.

SUMMARY OF THE INVENTION

The invention features, in general, a compressible valve for use with a pressurized container for dispensing an aerosol product. The pressurized container has a longitudinal axis defining a longitudinal direction and comprises a bottle having a closed end and an open end forming a neck longitudinally opposed to the closed end. A dispensing structure is disposed inside the open end of the bottle. The dispensing structure has an open end coaxial with the bottle open end. The dispensing structure can comprise a dip tube valve comprising a valve housing and a tube in a standard aerosol package. Alternatively, the dispensing structure can comprise an aerosol barrier package disposed in a bottle including a bag on valve design, a bag in bottle design or a piston in bottle design. The compressible valve is disposed inside the open top end of the bottle and interfaces with the dispensing structure. The compressible valve comprises a valve stem. The valve stem includes an open top portion, a closed bottom portion, and at least one primary radial opening proximate the closed bottom portion. Preferably, a secondary radial opening is disposed proximate the closed bottom portion wherein the primary radial opening is disposed between the secondary radial opening and the closed bottom portion. A valve stem passageway connects the open top portion and the at least one radial opening. A conduit is disposed proximate to the open top portion of the valve stem and includes a flowpath connected to the longitudinal passageway in the valve stem at a first end of the conduit and a dispensing opening at a second end of the conduit. Preferably, the conduit is formed integral with the valve stem.

The compressible valve further comprises a mechanical seal. The mechanical seal is disposed in the open end of the pressurized container and includes a longitudinal passageway. The valve stem is disposed in the longitudinal passageway of the mechanical seal such that the mechanical seal longitudinal passageway seals the at least one primary radial opening when the compressible valve is in a closed position. An actuator is disposed on the open top portion of the valve stem. The actuator includes a plug portion that seals the open top portion of the valve stem and can include stops that interface with the open end of the pressurized container to limit the vertical travel of the valve stem. Depressing the actuator longitudinally translates the valve stem exposing the at least one primary opening to the pressurized container when the compressible valve is in an open position.

The valve stem further comprises a primary flange disposed between the open top portion and the closed bottom portion. The primary flange has a top side and a bottom side. The bottom side of the primary flange interfaces with a biasing member on the valve assembly. A positive stop is disposed between the top side of the primary flange and the open top portion. The positive stop interfaces with the valve assembly to limit or prevent the vertical travel of the valve stem. An atomizer is disposed at the second end of the conduit forming the dispensing opening. The atomizer forms a colloid suspension of fine solid particles or liquid droplets in a gas.

The compressible valve can include a valve cup disposed in the open end of the pressurized container. The valve cup has an open top portion, a bottom portion with an opening therein and a longitudinal passageway between the open top portion and the bottom portion opening. The valve cup longitudinal passageway is coaxial with the bottle open top end and the dispensing structure open end. The aforementioned actuator stops can be configured to interface with the open top end of the valve cup. Alternatively, the open top portion of the valve cup can include diametrically opposed slots and raised portions (tabs) between the slots that interface with the valve stem positive stops. The valve stem is rotated to align the positive stops with the opposed slots when the valve assembly is in an open position and to align the positive stops with the opposed tabs when the valve assembly is in a locked position.

The mechanical seal can comprise a grommet disposed in the valve cup. The grommet has a spring portion and a sealing portion wherein the spring portion is integral with the sealing portion. The grommet spring portion is longitudinally opposed to the grommet sealing portion towards the open top portion of the valve cup and includes a spring portion opening having an internal diameter. The spring portion interfaces with the bottom side of the primary flange and is deformable in the longitudinal direction biasing the valve stem. The sealing portion includes a primary sealing section, a secondary sealing section, a tertiary sealing section and a sealing portion opening having an internal diameter. The grommet sealing portion is joined to the valve cup bottom portion opening such that the sealing portion opening is coaxial with the bottom portion opening. A grommet longitudinal passageway connects the spring portion opening and the sealing portion opening and has an internal diameter that is coaxial with the valve cup longitudinal passageway.

The grommet sealing portion extends radially along the external surface of the bottom portion of the valve cup forming the tertiary seal section which provides a seal between the dispensing structure and the valve cup. The sealing portion of the grommet can comprise a clevis composed of two vertically opposed discs forming a circumferential C-shaped opening. The two discs extend radially outward from the sealing portion opening sandwiching the bottom portion of the valve cup forming the valve cup opening therebetween.

The valve stem is disposed in the grommet passageway. The at least one secondary radial opening in the valve stem is disposed proximate to the closed bottom portion and the at least one primary radial opening is disposed between the at least one secondary radial opening and the closed bottom portion. The closed bottom portion of the valve stem is in sliding/contacting relationship with the internal diameter of the grommet longitudinal passageway near the grommet sealing portion opening such that the primary and secondary sealing sections seal the primary and secondary radial openings, respectively when the valve stem is in a closed position. Longitudinal translation of the valve stem exposes the at least one primary radial opening or both the at least one primary radial opening and the at least one secondary radial opening to the pressurized container when the valve stem is in an open position. In addition, the grommet sealing portion opening includes a wiper blade located at the sealing portion opening below the primary and secondary sealing sections. The wiper blade removes residual composition from the primary and secondary radial openings in the valve stem as the valve stem moves from an open position to a closed position.

The valve stem can be disposed in the grommet in a tilt valve or a vertical/unidirectional valve orientation. In the tilt orientation the top portion of the valve stem is tilted exposing the radial openings in the bottom portion of the valve stem to the aerosol product in the pressurized container. In the vertical orientation, the valve stem is arranged such that longitudinal translations of the valve stem results in substantially equivalent longitudinal compression of the grommet spring portion forcing the primary radial openings or both the primary radial openings and the secondary radial openings past the sealing portion opening, exposing the radial openings to the aerosol product in the pressurized container.

The valve stem primary flange can have a primary flange diameter and the valve cup can include a cylindrical portion having an internal diameter near the open top portion which is substantially equivalent to the primary flange diameter such that the valve stem primary flange is in sliding contacting relationship with the valve cup internal diameter. The contacting relationship stabilizes the position of the valve stem. In addition, the valve cup may also include an internal edge near the open top portion of the valve cup. The internal edge has a diameter that is less than the valve stem primary flange diameter to limit the vertical travel of the valve stem in the valve cup opening by interfacing with the top side of the primary flange.

The valve stem may also include a secondary flange between the primary flange and the closed bottom portion. The secondary flange has a secondary flange diameter that is substantially equal to the grommet longitudinal passageway internal diameter. The secondary flange forms a secondary seal between the valve stem and the grommet longitudinal passageway.

A dispensing structure comprising a dip tube is disposed inside the open top end of the bottle and includes a dip tube housing having an open top end that is threaded or press fit into a cylindrical bottom portion of the valve cup. The tertiary seal section of the grommet provides a seal between the open top portion of the dip tube housing and the valve cup.

A dispensing structure comprising a collapsible bag disposed inside the open top end of the bottle may include a bag on valve design or a bag in bottle design. The bag on valve design includes a collapsible bag having an opening that is coaxial with the bottle opening and a flange that attaches to a cylindrical bottom portion of the valve cup with the grommet tertiary seal section providing a seal between the flange and the bottom portion of the valve cup. The bag in bottle design includes a collapsible bag having a neck forming an open neck end attached to and coaxial with the open top end of the bottle. The valve cup is threaded, welded, glued or press fit into the open neck end of the bag and the grommet sealing portion provides a seal between the neck of the bag and the valve cup.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings.

FIGS. 8a, 8b, and 8c are schematic views of the compressible valve assembly shown in FIG. 5, illustrating the closed position (FIG. 8a), filling position (FIG. 8b), and the dispensing position (FIG. 8c).

FIG. 10 is a schematic view of a compressible valve assembly of this invention.

FIG. 11 is a schematic view of a compressible valve assembly of this invention.

DETAILED DESCRIPTION OF THE INVENTION

The compressible valve according to the present invention will be described with reference to the following figures which illustrate certain embodiments. It will be apparent to those skilled in the art that these embodiments do not represent the full scope of the invention which is broadly applicable in the form of variations and equivalents as may be embraced by the claims appended hereto. Furthermore, features described or illustrated as part of one embodiment may be used with another embodiment to yield still a further embodiment. It is intended that the scope of the claims extend to all such variations and equivalents.

Figure 1A:
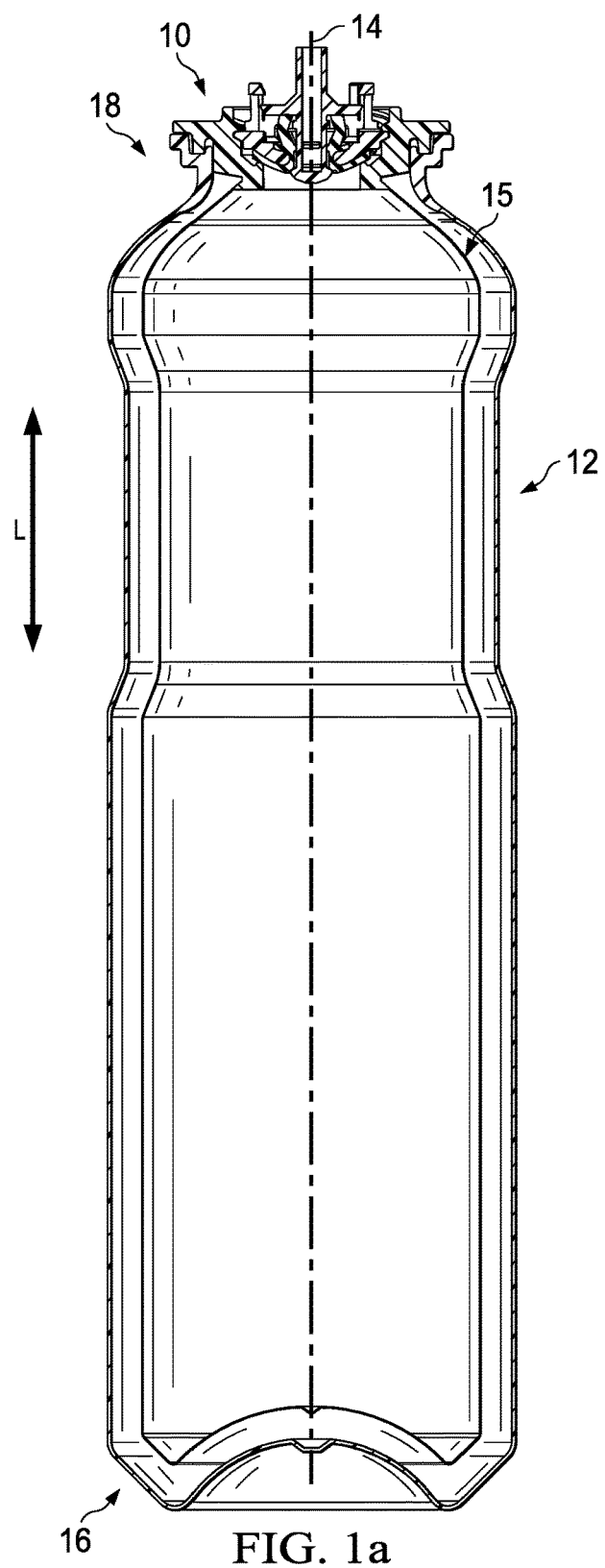
FIG. 1a is schematic view of a bottle including the compressible valve assembly of this invention with a collapsible bag assembled to the compressible valve.

FIG. 1a is a schematic illustration of a container 12 including a valve assembly 10 and a dispensing structure. The dispensing structure can comprise an aerosol barrier package disposed in a bottle including a bag on valve design, a bag on bottle design or a piston in bottle design. For the bag on valve and bag in bottle designs, product and propellant are separated via a bag. For the piston in bottle design, product and propellant are separated via a piston.

Figure 1B:
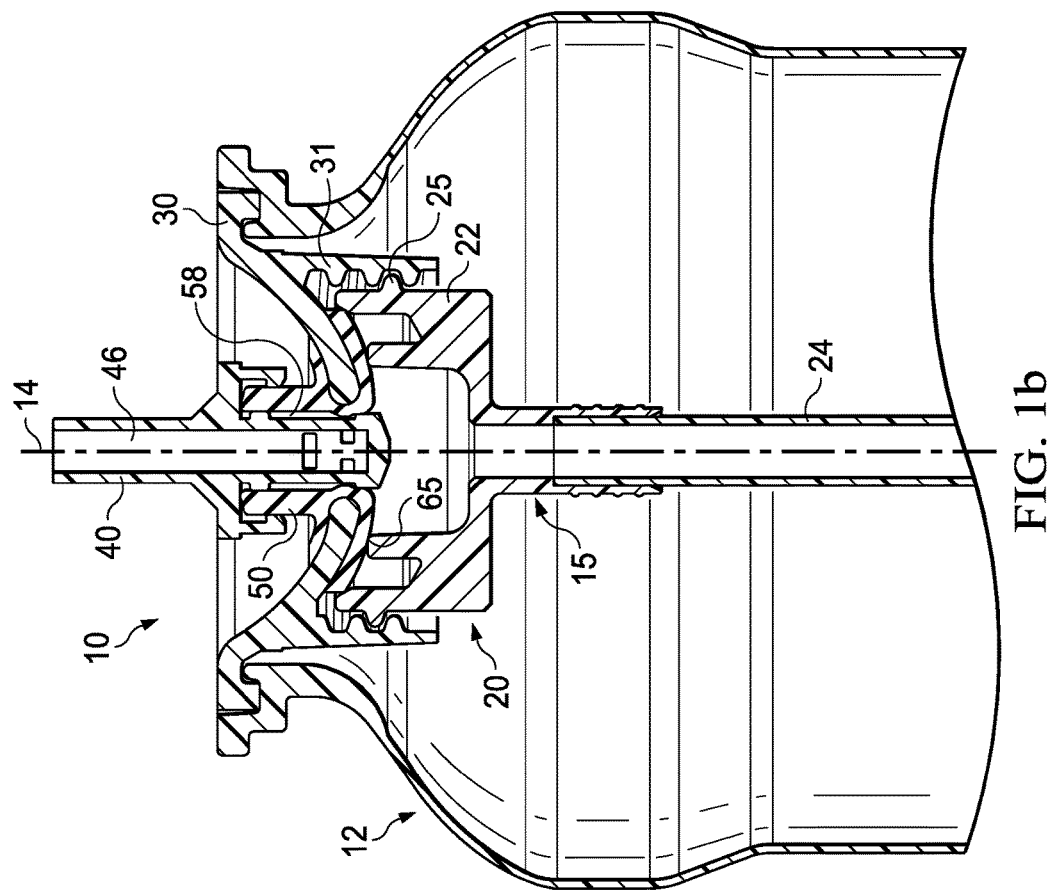
FIG. 1b is a schematic view of a compressible valve assembly of this invention with the dip tube housing attached to the valve.

As shown in FIG. 1a, the container comprises a bottle 12 having a longitudinal axis 14 defining a longitudinal direction L and a dispensing structure 15 comprising a bag on valve design. The bottle 12 has a closed bottom end 16 and an open top end 18. Alternatively, the dispensing structure 15 can comprise dip tube valve 20 shown in FIG. 1b. The dip tube valve 20 comprises a valve housing 22 and tube 24 in a standard aerosol package where product and propellant are mixed in a bottle or can and the solution is expelled due to pressure from the propellant in vapor phase forcing liquid up the tube and through the valve housing 22 to a nozzle when the valve is open. Valve housing 22 may be designed to include a vapor tap for vapor mixing during dispensing. For the embodiment shown in FIG. 1b, the valve housing 22 is attached to the bottom portion of the valve assembly 10. The valve assembly 10 is a three piece assembly composed of a valve cup 30, a valve stem 40 and a mechanical seal. The mechanical seal can comprise an annual O-ring or gasket or a resilient annular sealing grommet 50 as shown in FIG. 1b. Both the valve stem 40 and grommet 50 have longitudinal axes aligned with the bottle longitudinal axis 14 and respective vertical passageways 58 and 46.

Figure 2:
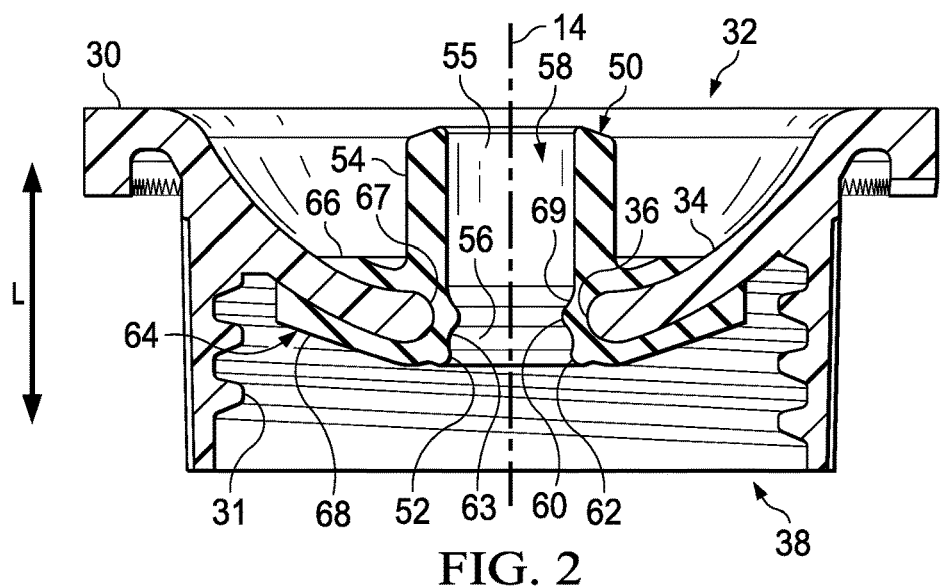
FIG. 2 is a schematic view of a valve cup and grommet of the compressible valve assembly shown in FIG. 1b.

For the embodiments shown in FIGS. 1a and 1b, the valve cup 30 is disposed inside the open top end 18 of the bottle 12. As shown in FIG. 2, the valve cup 30 has an open top portion 32 and a concave bottom portion 34 with an opening 36 in the center of the concave bottom portion 34. An open ended cylindrical portion 38 extends below the concave bottom portion 34 of the valve cup 30 for receiving the valve housing 22 of the dip tube valve 20 shown in FIG. 1b. The open ended cylindrical portion 38 can include internal female threads 31 for mating with external male threads 25 on the valve housing 22 for a threaded connection. Alternatively, the cylindrical portion 38 can include an internal rim for mating with an external rim on the valve housing for a snap fit connection.

The grommet 50 is disposed in the opening 36 in the concave bottom portion 34 of the valve cup 30. The grommet 50 has a sealing portion 52 and a spring portion 54. The spring portion 54 extends toward the valve cup open top portion 32 and is deformable in the longitudinal direction L. The spring portion 54 includes a spring portion opening 55 having an internal diameter. The sealing portion 52 is disposed opposite the spring portion 54 at the opening 36 in the concave bottom portion 34 of the valve cup 30 and includes a sealing portion opening 56 having an internal diameter. A grommet longitudinal passageway 58 connects the spring portion opening 55 and the sealing portion opening 56 and has an internal diameter that is coaxial with the opening 36 in the concave bottom portion 34 of the valve cup 30. The grommet longitudinal passageway 58 includes a seal lip 60 and wiper blade 62 near the sealing portion opening 56. The wiper blade 62 removes residual product from the valve stem 40 and the seal lip 60 seals the valve stem 40 as the valve stem 40 is retracted into its sealing position. The valve stem 40 is fully described below.

The sealing portion 52 of the grommet 50 also includes a cylindrical clevis 64 having an upper disc 66 and a lower disc 68 forming a C-shaped clevis 67 extending circumferentially around and radially outward away from the sealing portion opening 56. The concave bottom portion 34 of the valve cup 30 is interposed between the upper disc 66 and the lower disc 68 of the clevis 64 such that the sealing portion opening 56 is coaxial with the opening 36 in the concave bottom portion 34.

As the valve housing 22 is connected to the valve cup 30 (either press fitted, welded, glued or threaded), the lower disc 68 of the clevis 64 is compressed between the valve housing 22 and the concave bottom portion 34 of the valve cup 30 providing a seal 65 between the valve housing 22 and the concave bottom portion 34 of the valve cup 30. The seal 65 eliminates the need for a separate gasket or seal at the connection between the valve cup 30 and valve housing 22. With the seal, the male threads 25 on the external surface of the valve housing 22 can be limited to a half thread as opposed to a full thread for threaded connections. The seal 65 also enables a simple snap fit connection between the valve cup 30 and valve housing 22 without requiring an additional gasket or seal between the valve housing 22 and the valve cup 30.

The valve cup is preferably molded from Polyethylene Terephthalate (PET) and the grommet is molded from Thermoplastic Elastomer (TPE). PET is a standard resin currently used carbonated soft drink containers. The TPE formulation includes:

1) Base Elastomer—polyester based elastomer (from the Hytrel family of resins).
2) Tackifier—usually a small polymer or oligomer that provides the adhesion of the TPE to the PET (substrate)
3) Processing Aid—provides for process-ability of the material and subtle changes to the durometer of the material The TPE formulation is optimized for product/package compatibility, adhesion to the PET and compatibility with the current PET recycling stream. In addition the TPE can withstand swelling shrinking or changes in mechanical properties associated with a container under pressure. The preferred TPE is HCC8791-52 provided by Krailburg.

In order to provide ultimate adhesion between the valve cup and the sealing portion of the grommet, the valve cup and the grommet are preferably injection molded. The injection molding system could use a range of molding techniques to achieve the bonding necessary between the TPE and PET including but not limited to over molding, transfer molding, cube molding, core-back molding, spin-stack molding, helicopter molding, rotating platen molding.

Figure 3:
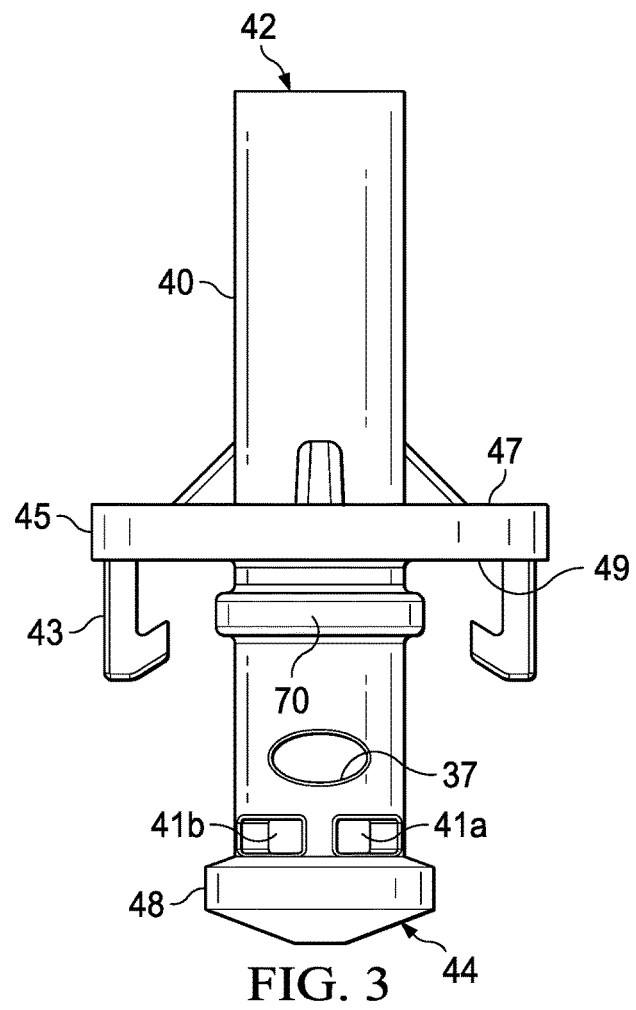
FIG. 3 is a schematic view of a valve stem of the compressible valve assembly in FIG. 1b.

The valve stem 40 shown in FIG. 3a comprises an elongate valve stem having an open top portion 42, a closed bottom portion 44 at least one primary radial opening 41 and preferably at least one secondary radial opening 37. The closed bottom portion 44 includes a protuberance forming a knob 48. The at least one secondary radial opening 37 is disposed proximate to the closed bottom portion 44 and the at least one primary radial opening 41 is disposed between the at least one secondary radial opening and the closed bottom portion 44. Preferably, two or more primary radial openings 41a, 41b are disposed in the bottom portion 44 above the knob 48. A passageway 46 extends between the open top portion 42 and both the at least one primary radial opening 41a and the at least one secondary radial opening 37. A primary flange 45 having a top side 47 and a bottom side 49 is disposed between the open top portion 42 and the knob 48. The bottom side 49 of the primary flange 45 interfaces with the spring portion 54 of the grommet 50 and includes L-shaped clasps 43 extending vertically from the bottom side 49 of the primary flange 45. The L-shaped clasps 43 grip the spring portion 54 of the grommet 50 and serve as a retention feature for the valve stem 40. A secondary flange 70 is disposed between the primary flange 45 and the knob 48. The secondary flange 70 interfaces with the grommet passageway 58 to prevent product from seeping up into the upper part of the grommet passageway 58 between the internal surface of the grommet passageway and the external surface of the valve stem 40.

The knob 48 on the lower portion of valve stem 40 fits into the sealing portion opening 56 in the grommet 50. When the valve 10 is in the closed position shown in FIG. 1a, the primary radial openings 41a, 41b in the valve stem 40 are sealed by primary sealing portion 63 of protruding lip 60 in the grommet sealing portion opening 56 and the top of the knob 48 abuts against the bottom surface of the primary sealing portion 63. Similarly, the secondary radial opening 37 is sealed by a secondary sealing portion 69 of the protruding lip 60. Product in the bottle is thereby effectively sealed from entering the primary and secondary radial openings 41a, 41b and 37, respectively. As the valve stem 40 is pressed vertically during actuation, the knob 48 moves down below the opening 56 exposing the primary radial openings 41a, 41b or both the primary and secondary radial openings 37 to the product. As the pressure is removed, the stem 40 retracts into the opening 56. During retraction of stem 40, the wiper blade 62 at the grommet sealing portion opening 56 removes residual product from the primary radial openings 41a, 41b or both the primary and secondary radial openings 37 and the primary and secondary sealing portions 63, 69 of the protruding lip 60 seal the corresponding openings.

The valve stem 40 is held closed by a return force exerted on the bottom side 49 of the primary flange 45 of the valve stem 40 by the spring portion 54 of the grommet 50. The spring portion 54 of the grommet 50 can exhibit a constant return force during the life of the unit.

Figure 4:
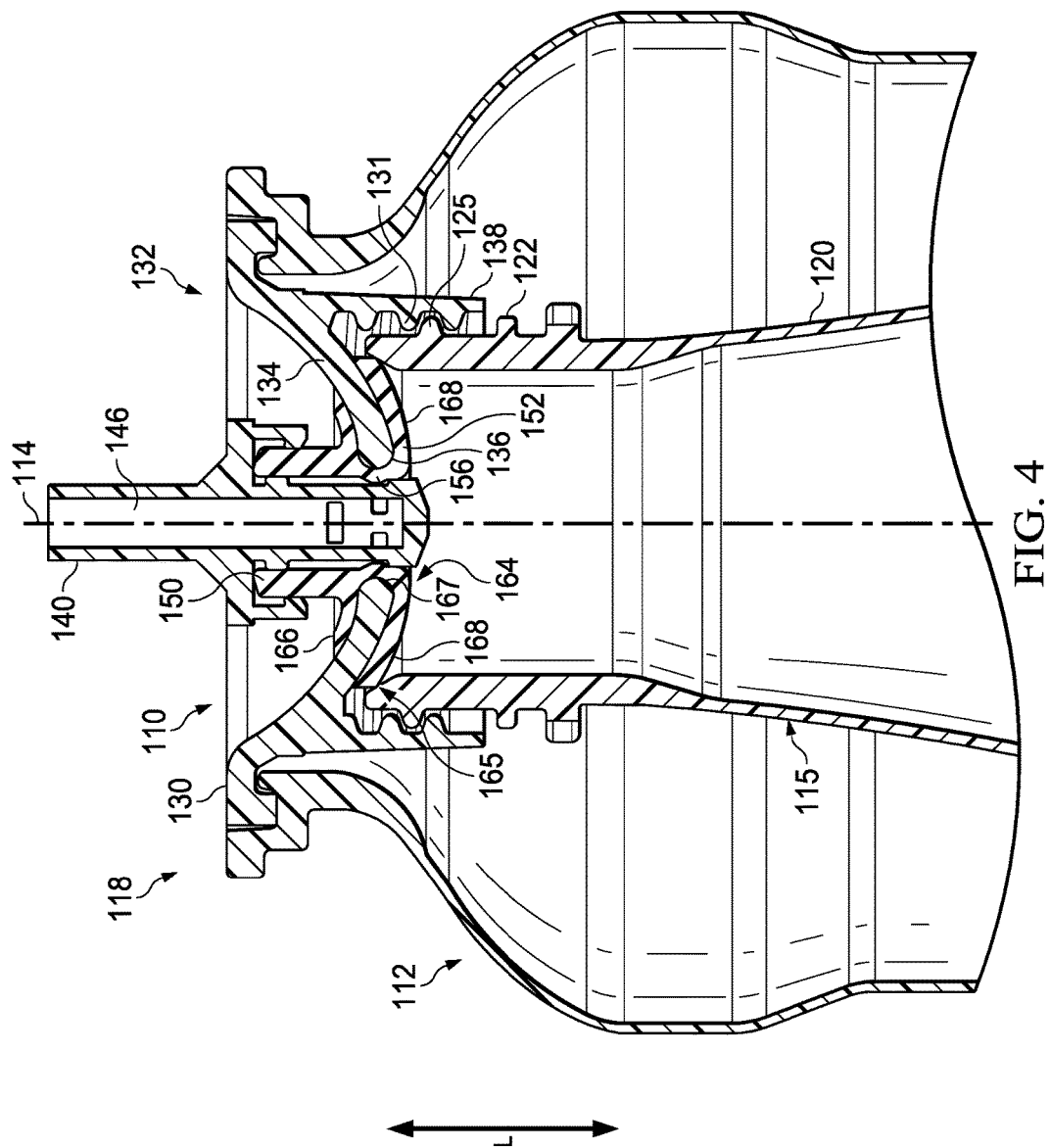
FIG. 4 is schematic view of a bottle opening including the compressible valve assembly of this invention with a collapsible bag assembled to the compressible valve.

A valve assembly 110 and bag on valve dispensing structure is shown in FIG. 4. The valve assembly 110 includes a valve stem 140 and a valve stem passageway 146. The bag on valve dispensing structure 115 shown in FIG. 4 includes a longitudinal axis 114, a bag 120 with a flange 122 at an open end attached to the bottom portion of the valve cup 130. For this embodiment, the valve cup 130 is disposed inside the open top end 118 of the bottle 112. The valve cup 130 has an open top portion 132 and a concave bottom portion 134 with an opening 136 in the center of the concave bottom portion 134. The valve cup 130 includes cylindrical walls 138 that extend below the bottom portion 134 of the valve cup 130 similar to the valve housing to valve cup connection previously described and shown in FIG. 1b. The cylindrical walls include internal (female) threads 131 that mate with external (male) threads 125 on the outer surface of the flange 122 at the bag open top portion. Alternatively, the cylindrical walls 138 can include an internal edge or rim that mate with an external rim or edge on the flange providing a snap fit arrangement.

For the bag on valve design shown in FIG. 4, the sealing portion 152 of the grommet 150 includes a cylindrical clevis 164 having an upper disc 166 and a lower disc 168 forming a C-shaped clevis 167 extending circumferentially around and radially outward away from the sealing portion opening 156. The concave bottom portion 134 of the valve cup 130 is interposed between the upper disc 166 and the lower disc 168 of the clevis 164 such that the sealing portion opening 156 is coaxial with the opening 136 in the concave bottom portion 134.

As the bag flange 122 is connected to the valve cup 130 (either press fitted or threaded), the lower disc 168 of the clevis 164 is compressed between the bag flange 122 and the concave bottom portion 134 of the valve cup 130 providing a seal 165 between the bag flange 122 and the concave bottom portion 134 of the valve cup 130. The seal 165 eliminates the need for a separate gasket or seal at the connection between the valve cup 130 and bag flange 122.

As shown in FIG. 4 the valve cup 130 is inserted into the neck of the bottle opening and sealed against the neck to prevent the escape of propellant and loss of pressurization. Any suitable propellant may be used and may comprise a hydrocarbon as is known in the art, nitrogen, air, and mixtures thereof. If desirable the propellant may be condensable. By condensable, it is meant that the propellant transforms from a gaseous state of matter to a liquid state of matter under the pressures encountered in use. A condensable propellant provides the benefit of a flatter depressurization curve as product is depleted during usage. The valve cup can be sealed to the neck of the bottle opening while the bottle is pressurized. A process for pressurizing the bottle and sealing the valve cup to the bottle opening is disclosed in commonly assigned US Patent Application Publications US2012/0292338A1, US2012/0291911A1; and US2012/0291912A1.

Figure 5:
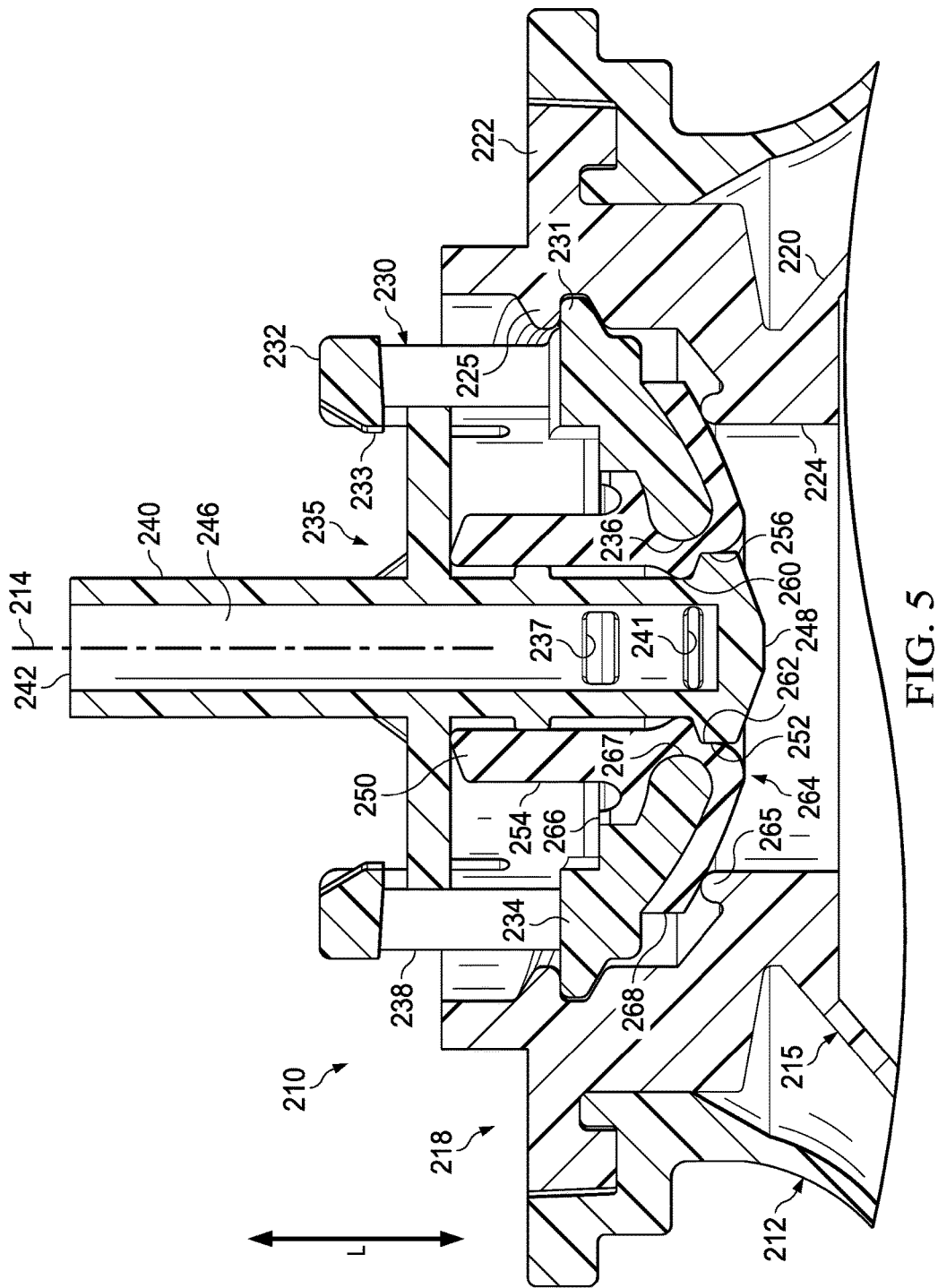
FIG. 5 is schematic view of a compressible valve assembly of this invention assembled in the opening of a collapsible bag which is assembled in a bottle opening.

For the bag in bottle design shown in FIG. 5, a bag on dispensing structure 215 includes a bag 220 is inserted into a bottle 212 having a longitudinal axis 214 and an outer flange 222 of the bag is held/sealed to a flange at the open top end 218 of the bottle 212 via a bottle to bag weld as described in US Patent Application Publications US2012/0292338A1, US2012/0291911A1; and US2012/0291912A1 referenced above. The bag opening includes an open neck portion 224 which is interposed between and coaxial with the bag outer flange 222 and the bottle opening. For this embodiment, the valve cup 230 of the valve cup assembly 210 is put together in the opening in the top portion of the bag 220. Product is contained in the bag within the bottle, and is filled through the valve assembly. Propellant surrounds the bag 220 and is filled either through a port in the bottom of the bottle or through gaps between the bottle opening flange and the bag outer flange prior to welding. Product is expelled due to pressure being applied to the bag and forcing solution out through the valve, which is similar to squeezing a tube to dispense product.

Referring to FIG. 5, a valve assembly 210 includes a valve stem 240, a valve cup 230, and mechanical seal (e.g., a grommet 250). For the embodiment shown in FIGS. 5 and 6, the valve cup 230 has an open top portion 232 and a concave bottom portion 234 with an opening 236 in the center of the concave bottom portion 234. An open ended cylindrical portion 238 extends between the open top portion 232 and the concave bottom portion 234. The open ended cylindrical portion 238 includes a longitudinal passageway 235 having an internal diameter that extends in the longitudinal direction L between the open top portion 232 and the concave bottom portion 234. An internal rim or edge is disposed in the longitudinal passageway near the open top portion of the valve cup. The internal rim 233 has an internal diameter that is less than the internal diameter of the cylindrical portion 238 longitudinal passageway 235. The valve cup 230 can include external (male) threads 231 on the outer surface that thread into internal (female) threads 225 in the open top portion of the bag 220. Alternatively, the valve cup 234 can include a rim on the outer surface that mates with a rim on the open top portion of the bag providing a snap fit.

For the bag in bottle design shown in FIG. 5, the sealing portion 252 of the grommet 250 also includes a cylindrical clevis 264 having an upper disc 266 and a lower disc 268 forming a C-shaped clevis 267 extending circumferentially around and radially outward away from the sealing portion opening 236. The concave bottom portion 234 of the valve cup 230 is interposed between the upper disc 266 and the lower disc 268 of the clevis 264 such that the sealing portion opening 256 is coaxial with the opening in the concave bottom portion.

As the valve cup 230 is connected to the bag opening (either press fit or threaded), the lower disc 268 of the clevis 264 is compressed between the neck of bag opening 224 and the concave bottom portion 234 of the valve cup 230 providing a seal 265 between the bag opening 224 and the concave bottom portion 234 of the valve cup 230. The seal 265 eliminates the need for a separate gasket or seal at the connection between the valve cup and bag opening.

Figure 7A:
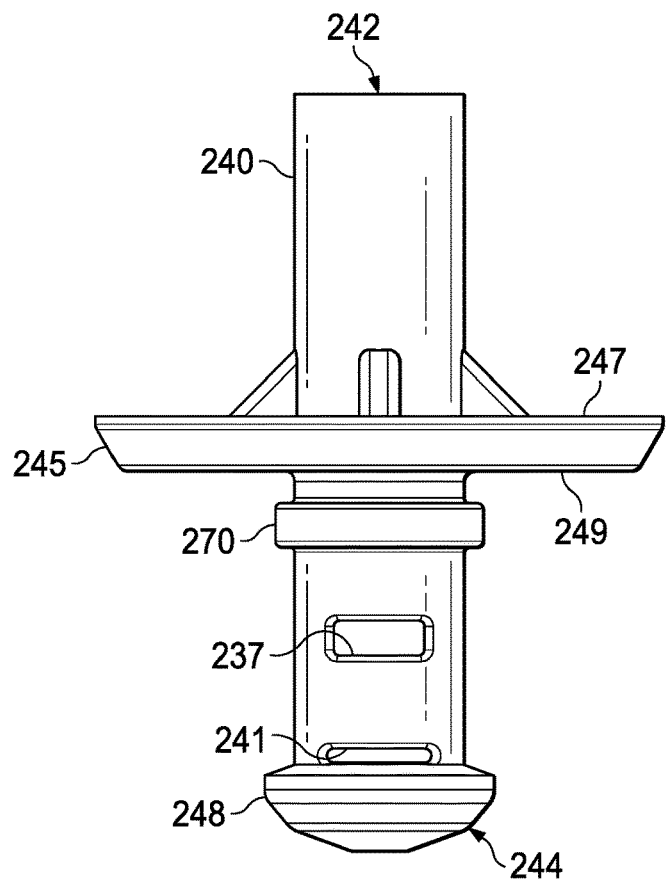
FIGS. 7a and 7b are schematic views of the valve stem of the compressible valve assembly shown in FIG. 5.
Figure 7B:
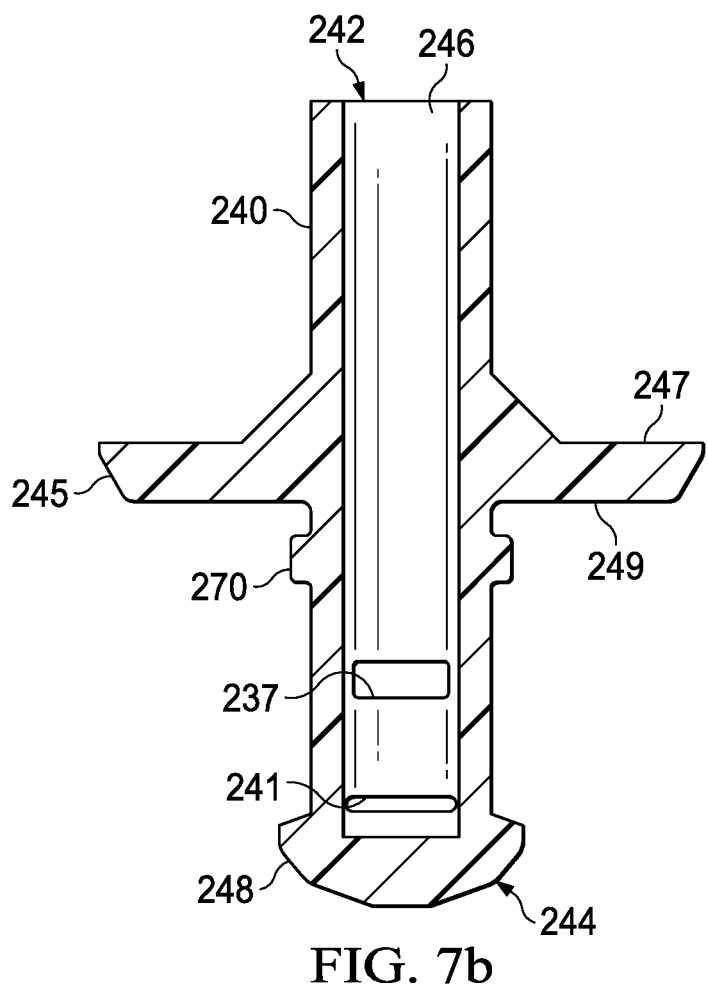

Similar to the other embodiments previously described, the valve stem 240 for the bag in bottle design shown in FIG. 5 comprises an elongate valve stem 240. As shown in FIGS. 7a and 7b, the elongate valve stem 240 comprises an open top portion 242 and a closed bottom portion 244 with a valve stem passageway 246 therebetween. The closed bottom portion 244 includes a protuberance forming a knob 248, at least one primary radial opening 241 and at least one secondary radial opening 237. The at least one secondary radial opening 237 is disposed proximate to the closed bottom portion 244 and the at least one primary radial opening 241 is disposed between the at least one secondary radial opening 237 and the closed bottom portion 244. The valve stem passageway 246 extends between the open top portion 242 and both the at least one primary radial opening 241 and the at least one secondary radial opening 237. The primary radial opening 241 and the secondary radial opening 237 are in fluid communication with the valve stem passageway 246.

A primary flange 245 having a top side 247 and a bottom side 249 is disposed between the open top portion 242 and the knob 248 at the closed bottom portion 244 of the valve stem 240. The bottom portion 249 of the primary flange 245 interfaces with the spring portion 254 of the grommet 250. Similar to the stems previously described, the primary flange 245 of the valve stem can include L-shaped clasps extending vertically from the bottom side of the flange that interface with the spring portion of the grommet for retention of the valve stem in the valve cup. Alternatively, for this embodiment, the outer diameter of the primary flange 245 can be sized to provide a slip fit between the primary flange 245 and the longitudinal passageway 235 of the open top portion 232 of the cylindrical portion 238 to help dimensionally stabilize valve stem 240 and minimize any tendency to tilt during actuation. The diameter of the primary flange 245 is also larger than the internal diameter of the internal rim 233 or edge disposed in the longitudinal passageway near the open top portion 232 of the valve cup 230 to retain the valve stem 240 in the valve cup 230. A secondary flange 270 is disposed between the primary flange 245 and the knob 248. The secondary flange 270 interfaces with the grommet passageway 258 to prevent product from seeping up into the upper part of the grommet passageway 258 between the internal surface of the grommet passageway and the external surface of the valve stem 240.

Figure 6:
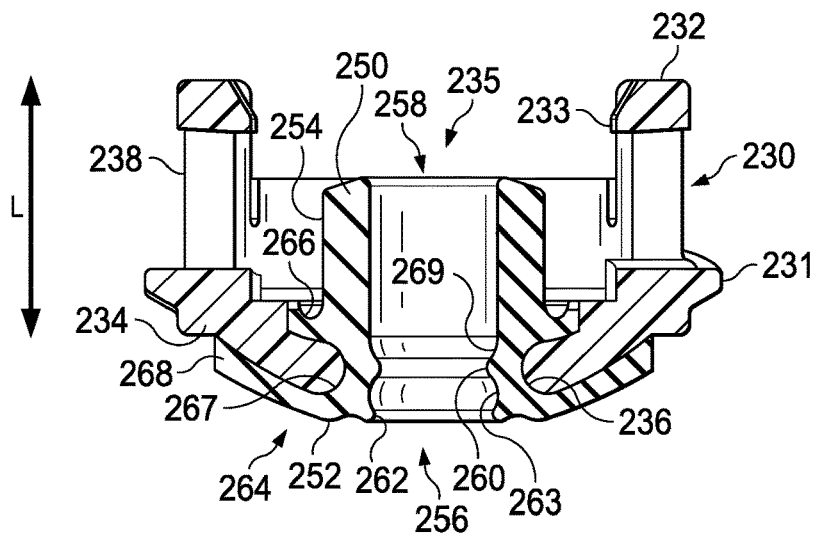
FIG. 6 is a schematic view of a valve cup and grommet of the compressible valve assembly shown in FIG. 5.

As shown in FIGS. 5 and 6, the knob 248 on the lower closed portion 244 of valve stem 240 fits into the sealing portion opening 256 in the grommet 250. When the valve assembly 210 is in the closed position, the primary radial opening 241 in the valve stem 240 is sealed by primary sealing portion 263 of protruding lip 260 in the grommet sealing portion opening 256 and the top of the knob 248 abuts against the primary sealing portion 263 thereby effectively sealing the product in the bottle 212 from entering the valve opening 241. Similarly, when the valve stem is in the closed position, the secondary radial opening 237 in the valve stem 240 is sealed by secondary sealing portion 269 of protruding lip 260 in the grommet sealing portion opening 256 thereby effectively sealing the product in the bottle 212 from entering the secondary radial openings 237. When the valve stem 240 is pressed vertically during actuation, the knob 248 moves down below the opening 256 exposing the primary radial opening 241 or both the primary and the secondary radial openings 241 and 237 to the product. As the pressure is removed, valve stem 240 retracts into the opening 256. During retraction, the wiper blade 262 at the grommet sealing portion opening 256 removes residual product from the primary radial opening 241 or the primary and secondary radial openings 241 and 237 and the primary and secondary sealing portions 263 and 269 at the protruding lip 260 seal the corresponding openings.

Figure 8A:
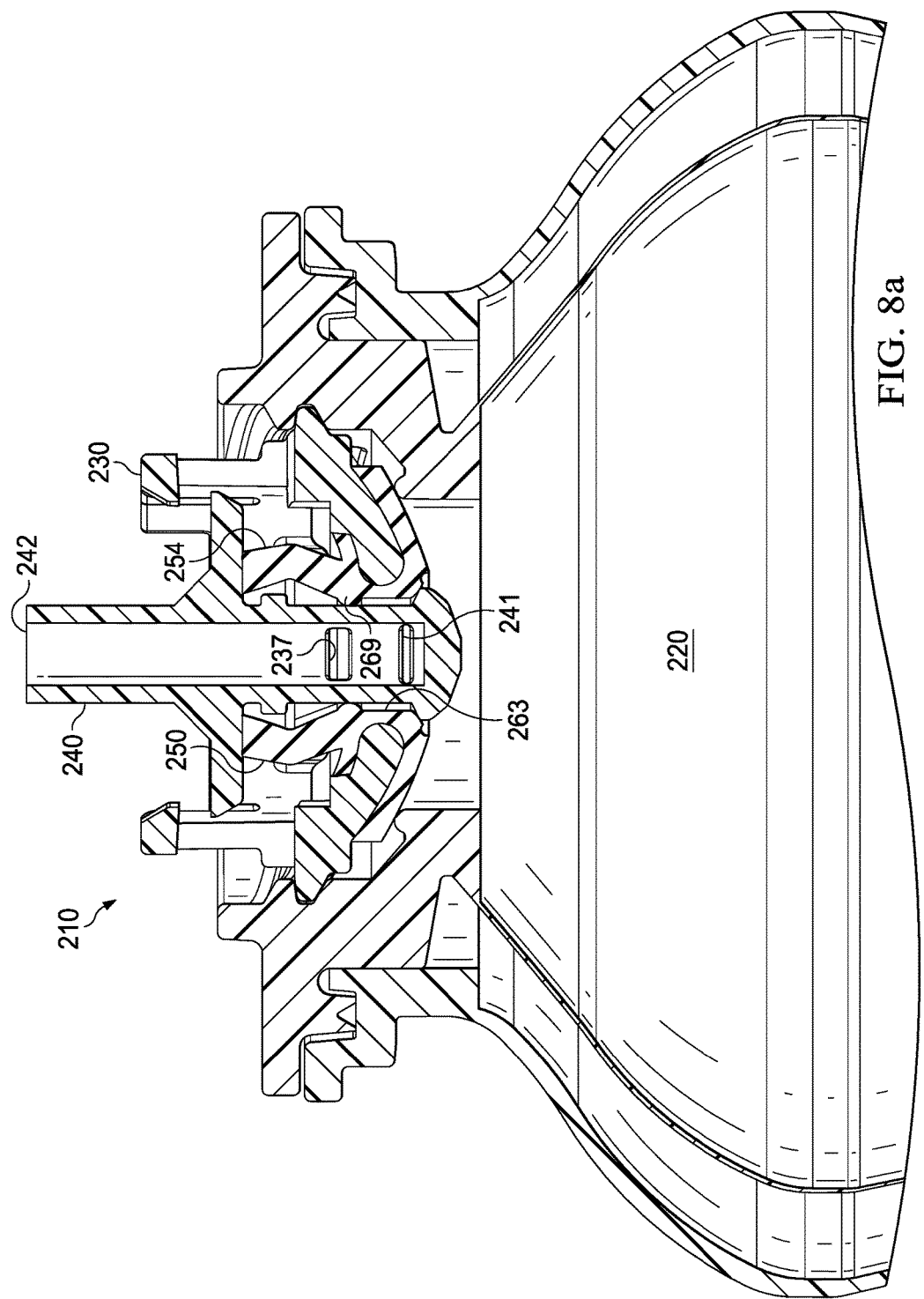
Figure 8B:
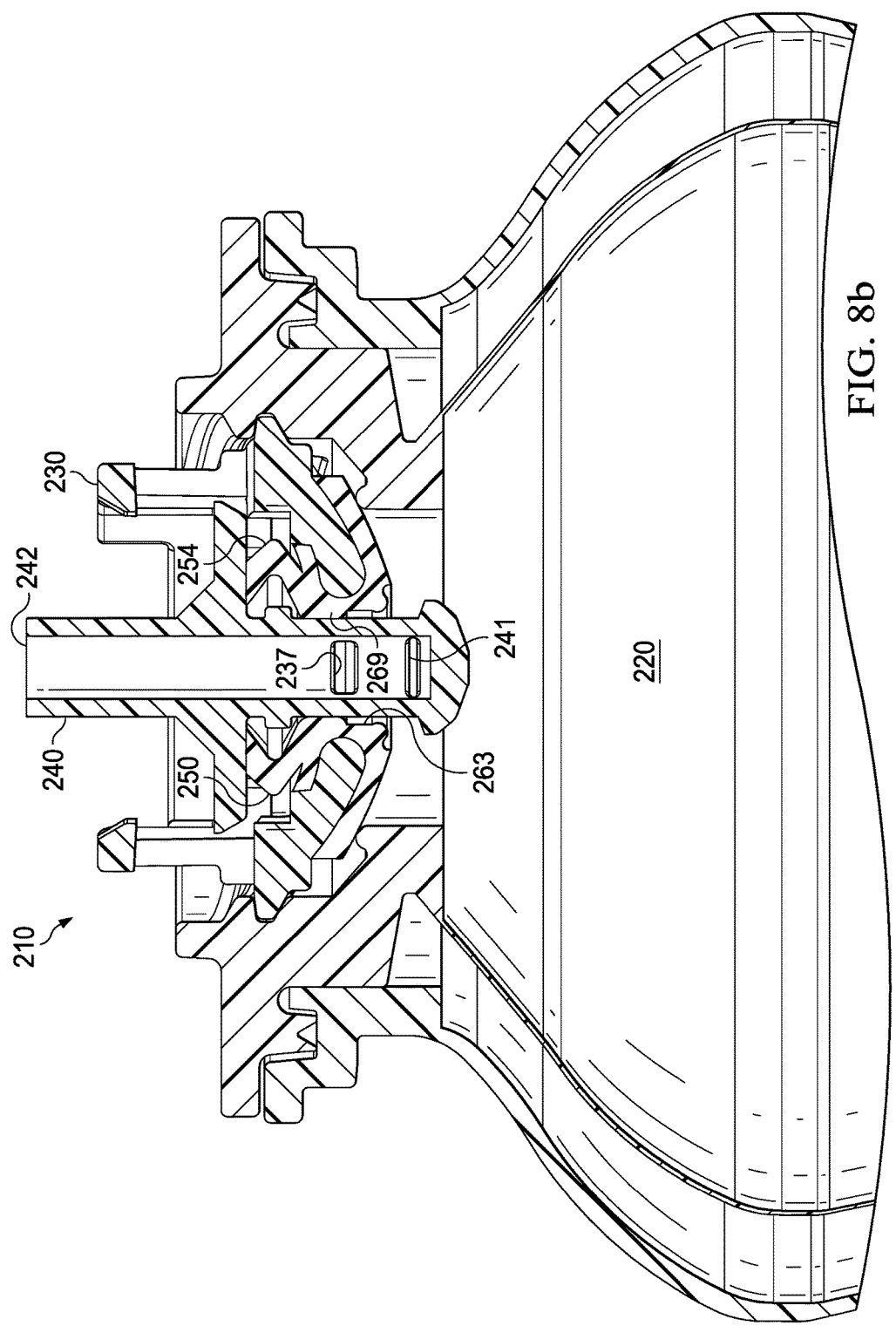

FIGS. 8a, 8b and 8c illustrate the different orientations of the valve stem 240 for the valve assembly 210 shown in FIG. 5, while the valve assembly 240 is at rest, during filling operation and during product dispensing by the consumer. As shown in FIG. 8a, at rest, the spring portion 254 of the grommet 250 causes the valve stem 240 to retract so that the primary sealing portion 263 and the secondary sealing portion 269 of the grommet 250 align with the primary radial opening 241 and the secondary radial opening 237, respectively, in the valve stem 240. For the valve assembly 210 shown in FIG. 8b, the valve stem 240 is compressed vertically against the spring portion 254 of the grommet 250 exposing both the primary radial opening 241 and the secondary radial opening 237 to product in the bag 220 in order provide maximum flow during product filling through the valve stem opening 242. For the valve assembly 210 shown in FIG. 8c, the valve stem is depressed vertically exposing only the primary radial opening 241 in order to limit and/or control the amount of product dispensed by the consumer.

In order to limit the vertical distance the valve stem can travel in the longitudinal direction L during use, the valve assembly 210 can include features that prevent the consumer from exposing the secondary radial openings during use. For instance, the spring portion 254 of the grommet 250 can be designed with a large enough spring rate that prevents the consumer from compressing the valve stem 240 far enough during use that would result in exposing both the primary and the secondary radial openings 241, 237 to the product in the bag 220. During the filling operation, the spring rate could be overcome by applying adequate force necessary to compress the valve stem and expose both the primary radial opening 241 and the secondary radial opening 237 to the interior of the bag 220.

Figure 9A:
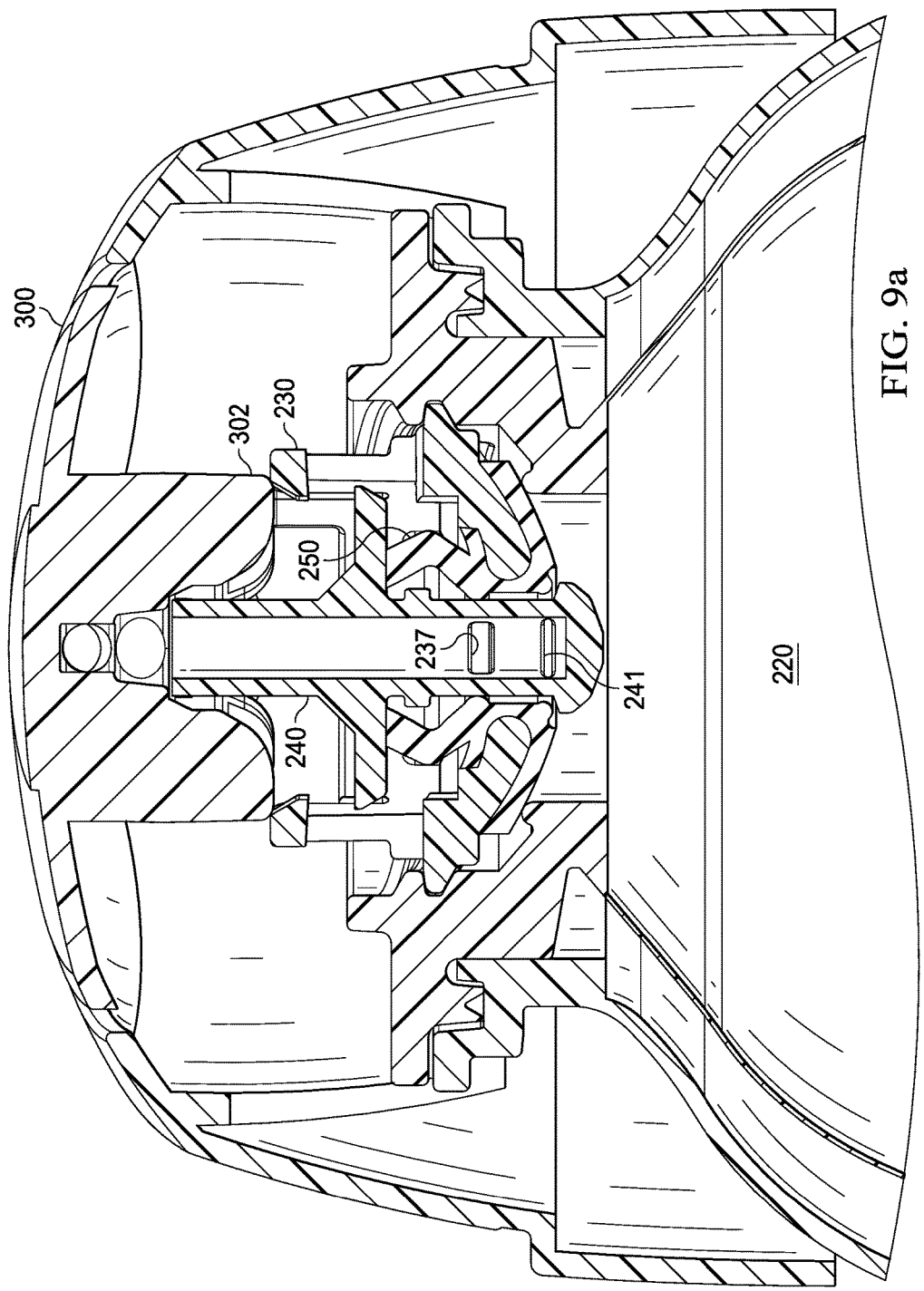
FIGS. 9a and 9b are schematic views of the compressible valve assembly shown in FIG. 5 including an actuator, illustrating the closed position (FIG. 9a) and the open position (FIG. 9b).
Figure 9B:
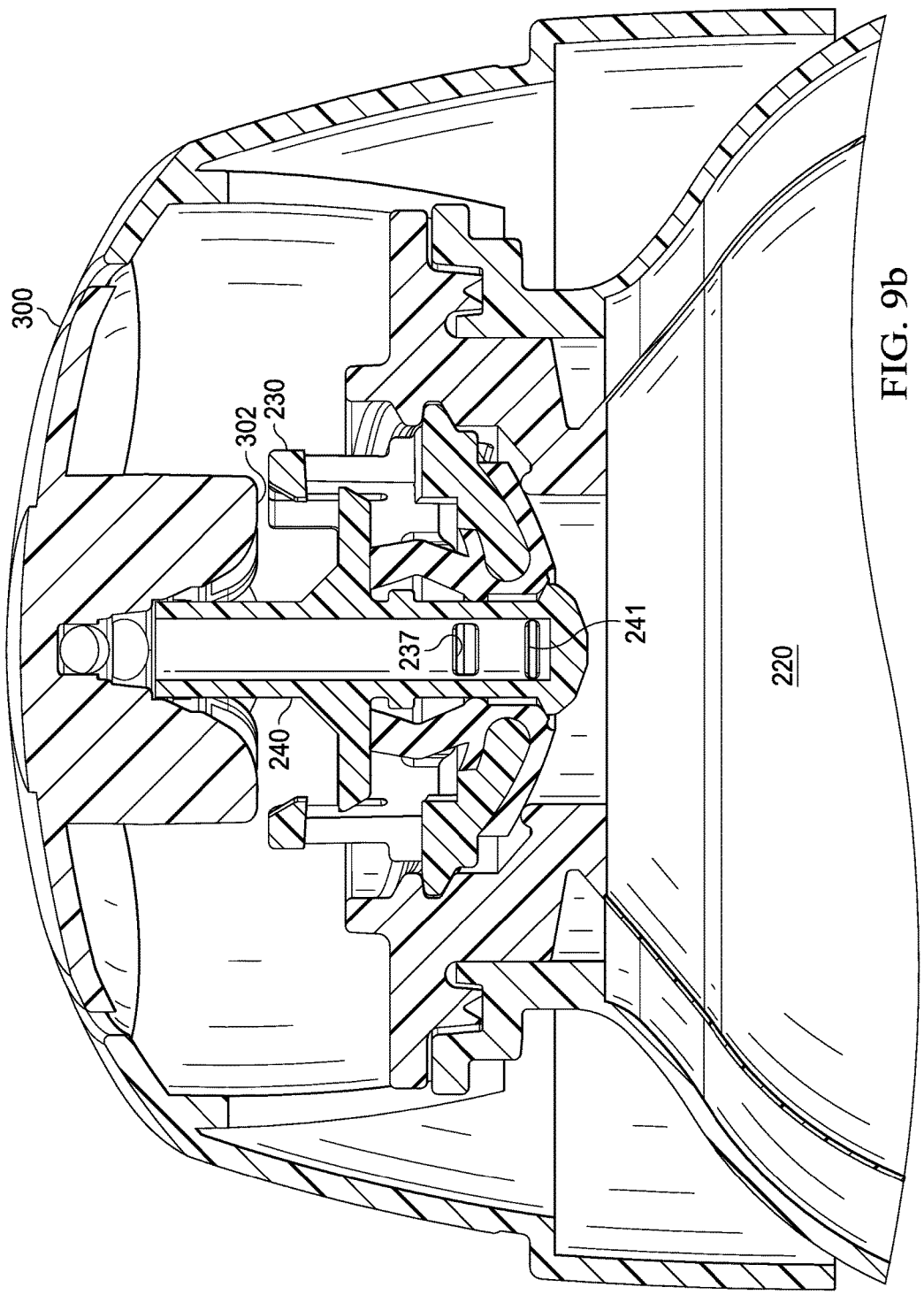

Alternatively, since filling operations are typically accomplished prior to installing an actuator and nozzle to the valve assembly, the actuator and/or valve can be designed to restrict the vertical travel of the valve stem during use. For instance, the embodiment illustrated in FIGS. 9a and 9b, show an actuator 300 assembled on the valve stem 240 that includes stops 302 that interface with the valve cup 230. At rest, FIG. 9b, a space exist between the stops 302 and the valve cup 230; however, in use, the stops 302 interface with the top of the valve cup 230 restricting the vertical travel of the valve stem 240 so that only the primary radial opening(s) 241 is exposed to the bag 220 opening and not the secondary radial opening 237.

Although it is preferred to separate the primary and secondary radial openings and limit the exposure of both to filling operations, alternate embodiments illustrated in FIG. 10 and FIG. 11 show valve stem designs including multiple primary radial openings 241 located at different longitudinal locations along the valve stem 240 that can be exposed to product in the container depending on the amount of force applied by the consumer. As a result, the valve assembly can be made that enables the consumer to control the flow of product from the bag by compressing pressing the valve stem at different depths exposing more radial openings to increase the flow rate while dispensing product.

Figure 12:
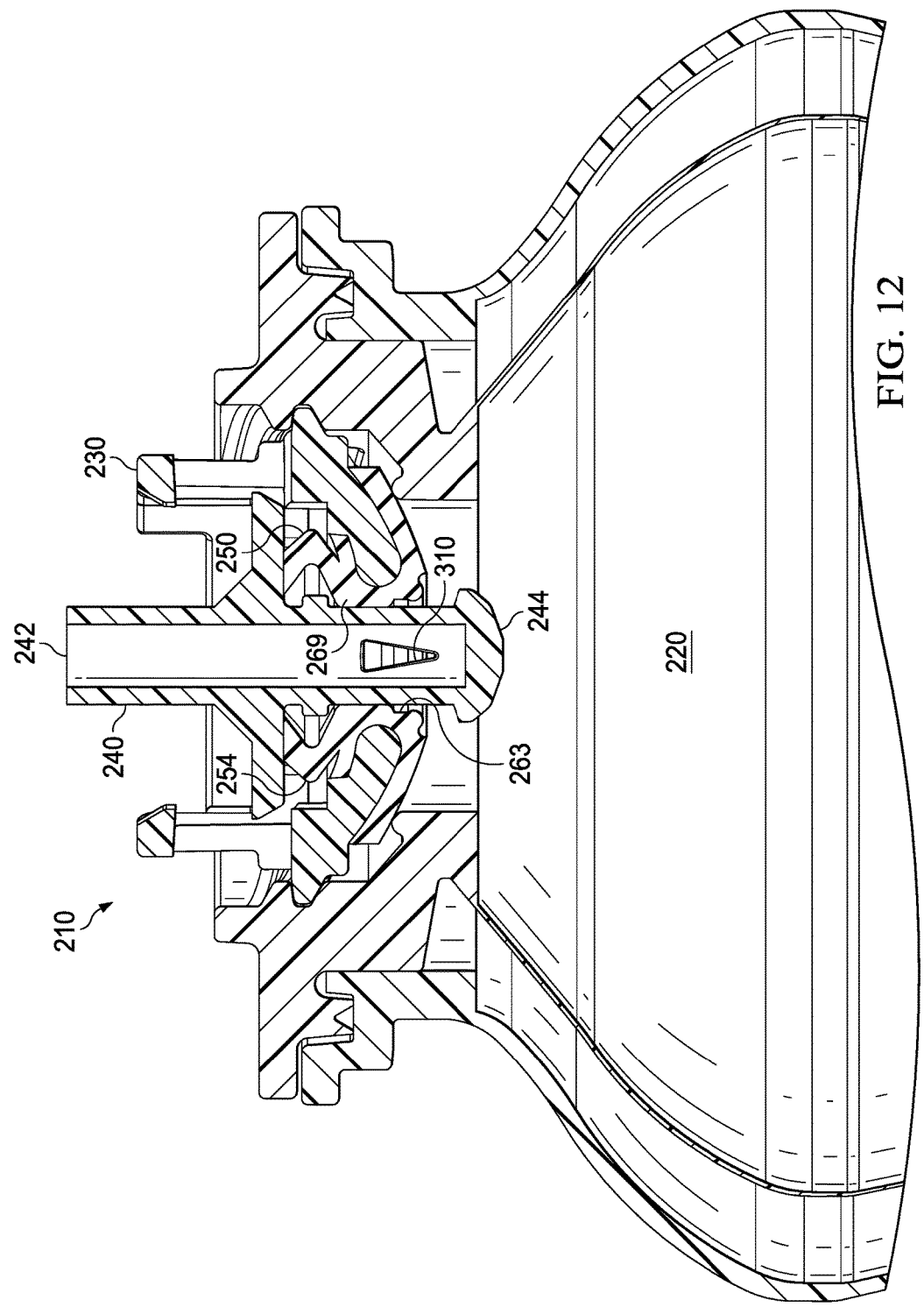
FIG. 12 is a schematic view of a compressible valve assembly of this invention.

Another embodiment is shown in FIG. 12, where the primary and the secondary radial openings are replaced with a single radial opening 310. For the embodiment shown in FIG. 12, the radial opening 310 is triangular in shape with the apex of the triangular disposed near the closed bottom portion 244 of the valve stem 240. As the valve stem 240 is compressed vertically, the triangular opening is increasingly exposed resulting in increased flow. For this embodiment, the valve stem 240 can be compressed vertically exposing the entire triangular opening during filling. For this embedment, while the entire opening can be exposed during filling operation, the aforementioned restriction can be applied to limit the vertical travel of the valve stem 240 so that the controlled flow rate is limited during consumer use.

In an alternate embodiment, the valve stem according to the present invention further comprises a conduit forming a nozzle portion of the valve stem. Similar to the valve stem described and shown in FIGS. 3a, 7a, and 7b, valve assembly 310 shown in FIG. 13 and FIG. 14 comprises an elongate valve stem 340 having an open top portion 342, a closed bottom portion 344 at least one primary radial opening 341 and preferably, at least one secondary radial opening 337. The closed bottom portion 344 includes a protuberance forming a knob 348. The at least one secondary radial opening 337 is disposed proximate to the closed bottom portion 344 and the at least one primary radial opening 341 is disposed between the at least one secondary radial opening 337 and the closed bottom portion 344. Preferably, two or more primary radial openings 341a, 341b are disposed in the bottom portion 344 above the knob 348. A longitudinal passageway 346 extends between the open top portion 342 and both the at least one primary radial opening 341a and the at least one secondary radial opening 337. A primary flange 345 having a top side 347 and a bottom side 349 is disposed between the open top portion 342 and the knob 348. A secondary flange 370 is disposed between the primary flange 345 and the knob 348. A conduit 380 is disposed proximate the open top portion 342, preferably integrally formed with the valve stem 340. The conduit 380 extends from the valve stem 340 at an angle α relative to the valve stem longitudinal passageway 346 having a longitudinal axis L extending through. Preferably, the angle α is greater than 0 degrees and less than or equal to 90 degrees; more preferably equal to or greater than 45 degrees and less than or equal to 90 degrees; most preferably the conduit is disposed at an angle α of 90 degrees or perpendicular relative to the valve stem longitudinal passageway 346.

Figure 13:
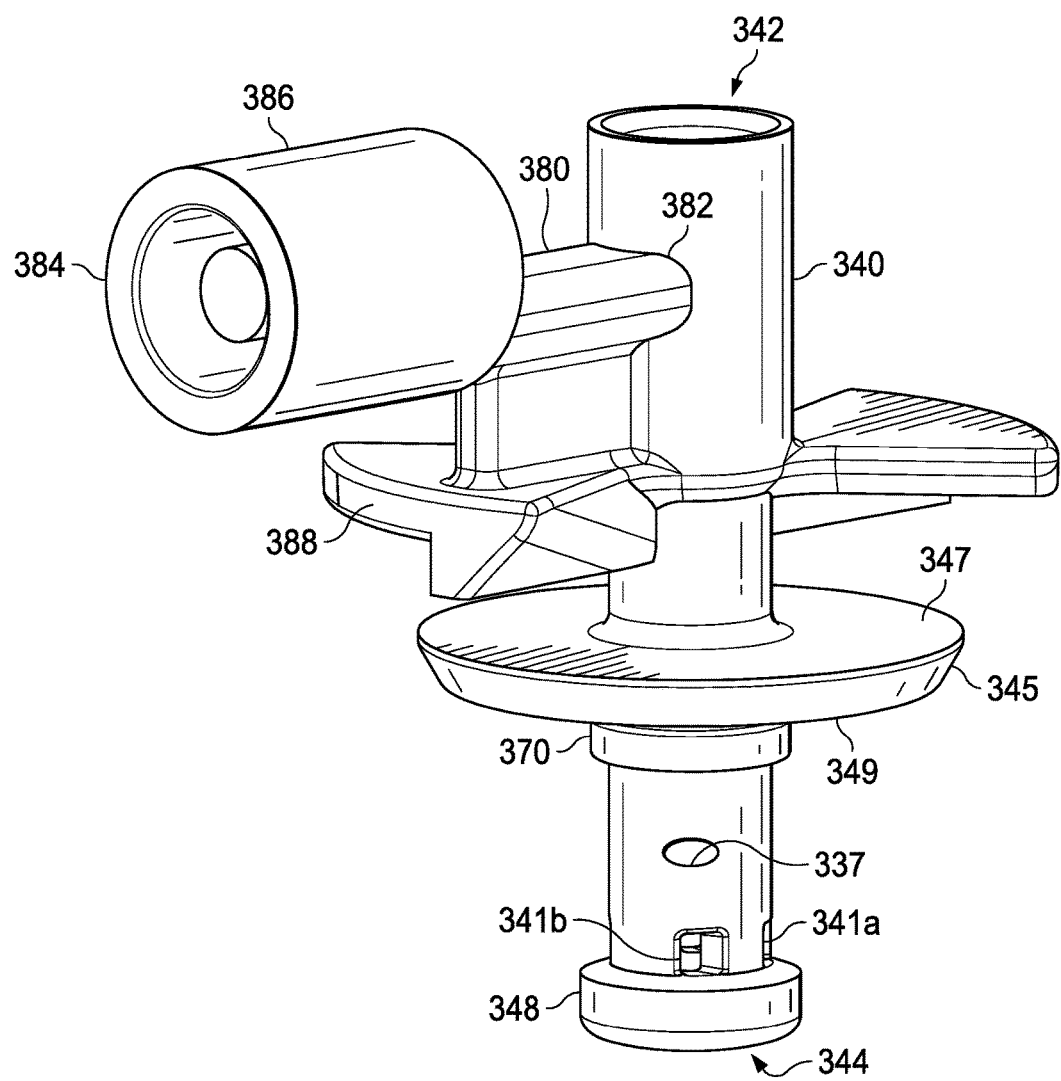
FIG. 13 is a schematic view of a valve stem of the compressible valve assembly of this invention including a conduit.
Figure 15:
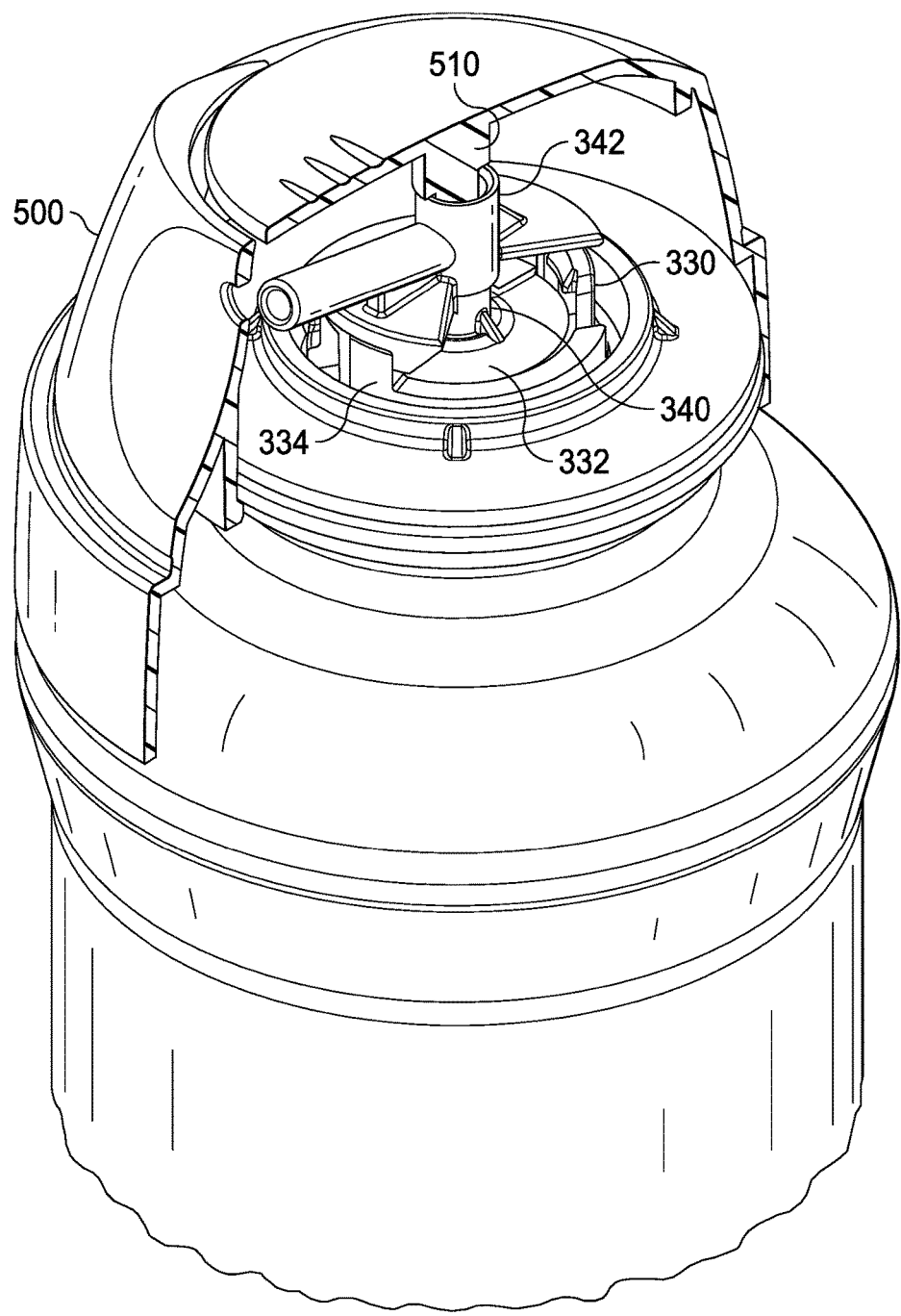
FIG. 15 is a schematic view of a compressible valve assembly of FIG. 14 including an actuator.

The conduit includes a flowpath 390 joining the valve stem passageway at a conduit first end 382 to a dispensing portion opening at a conduit second end 384. The dispensing portion opening can include a nozzle and/or an atomizer 386 as shown in FIG. 13. Preferably, the conduit 380 and corresponding flowpath are integrally formed with the valve stem 340 thereby eliminating the need for a separate dispensing nozzle. The valve stem 340 also includes a positive stop 388 located between the open top portion 342 of the valve stem 340 and the primary flange 345. The positive stop 388 is configured to interface with the pressurized container opening or the valve cup opening in order to limit or prevent the vertical travel of the valve stem. For instance, as shown in FIG. 15, the open top portion of the valve cup 330 can include diametrically opposed slots 332 and diametrically opposed tabs or raised portions 334 between the slots 332 that interface with the valve stem positive stops 388. The valve stem 340 is rotated to align the positive stops 388 with the slots 332 when the valve assembly 310 is in an open position and to align the positive stops 388 with the tabs 334 when the valve assembly is in a locked position.

Figure 14:
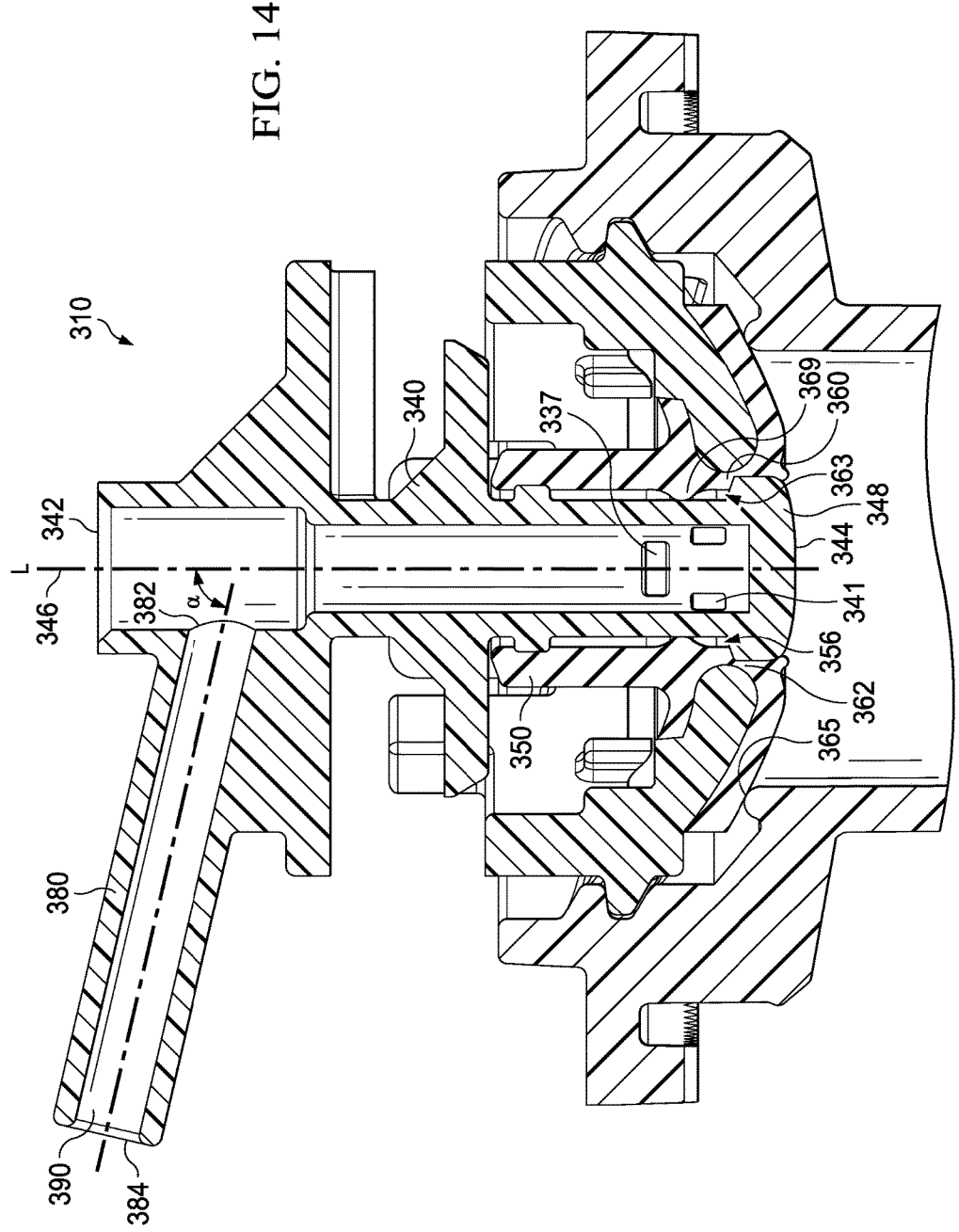
FIG. 14 is a schematic view of a compressible valve assembly including the valve stem in FIG. 13.

As shown in FIG. 14, the knob 348 on the lower closed portion 344 of valve stem 340 fits into the sealing portion opening 356 in the grommet 350. When the valve assembly 310 is in the closed position, the primary radial opening 341 in the valve stem 340 is sealed by primary sealing portion 363 of protruding lip 360 in the grommet sealing portion opening 356 and the top of the knob 348 abuts against the primary sealing portion 363 thereby effectively sealing the product in the bottle from entering the valve opening 341. Similarly, when the valve stem is in the closed position, the secondary radial opening 337 in the valve stem 340 is sealed by secondary sealing portion 369 of protruding lip 360 in the grommet sealing portion opening 356 thereby effectively sealing the product in the bottle from entering the secondary radial openings 337. When the valve stem 240 is pressed vertically during actuation, the knob 248 moves down below the opening 356 exposing the primary radial opening 341 or both the primary and the secondary radial openings 341 and 337 to the product. As the pressure is removed, valve stem 340 retracts into the opening 356. During retraction, the wiper blade 362 at the grommet sealing portion opening 356 removes residual product from the primary radial opening 341 or the primary and secondary radial openings 341 and 337 and the primary and secondary sealing portions 363 and 369 at the protruding lip 360 seal the corresponding openings.

An actuator 500 is disposed on the open top portion 342 of the valve stem 340 as shown in FIG. 15. The actuator 500 includes a fitment 510 forming a plug that seals the open top portion 342 of the valve stem 340. The plug fitment 510 can also form a pin or dowel which reduces the volume of the stem flow channel when inserted into the stem cavity. The fitment 510 can also be designed to introduce a flow channel geometry which induces turbulence in order to assist in droplet or foam formation.

The actuator can also include stops that interface with the open end of the pressurized container or valve cup as shown in FIGS. 9a and 9b to limit the vertical travel of the valve stem. Depressing the actuator vertically translates the valve stem exposing the at least one primary opening or both the at least one primary radial opening and the at least one secondary radial opening to the pressurized container when the compressible valve is in an open position.

The open top portion 342 of the valve stem can provide a port for filling product during manufacturing and/or packaging. The open top portion can also provide an insertion port for dissolvable additives such as perfumes, colorants and actives, etc.

Figure 16A:
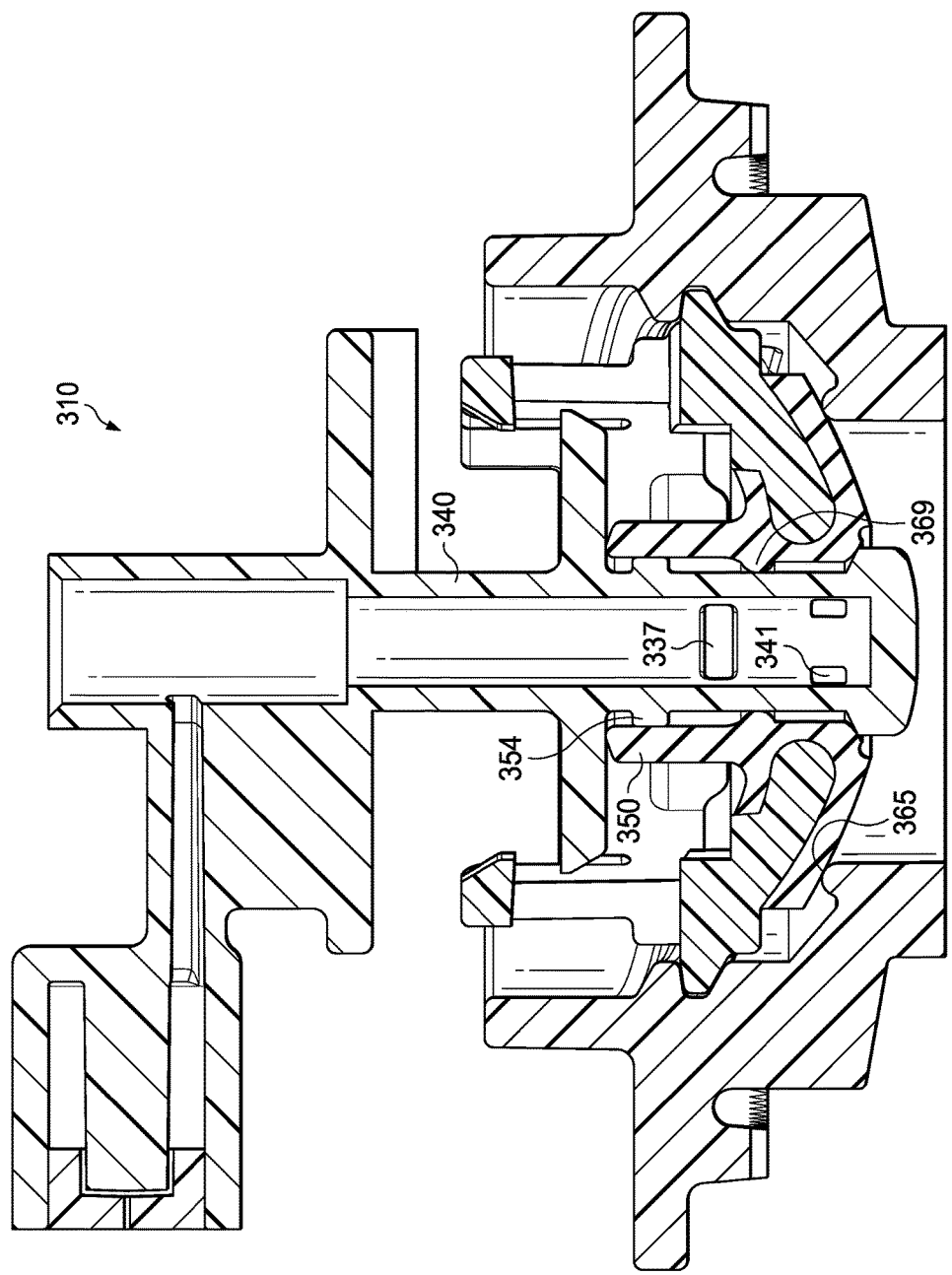
FIGS. 16a, 16b, and 16c are schematic views of the compressible valve assembly shown in FIG. 14, illustrating the closed position (FIG. 16a), filling position (FIG. 16b), and the dispensing position (FIG. 16c).
Figure 16B:
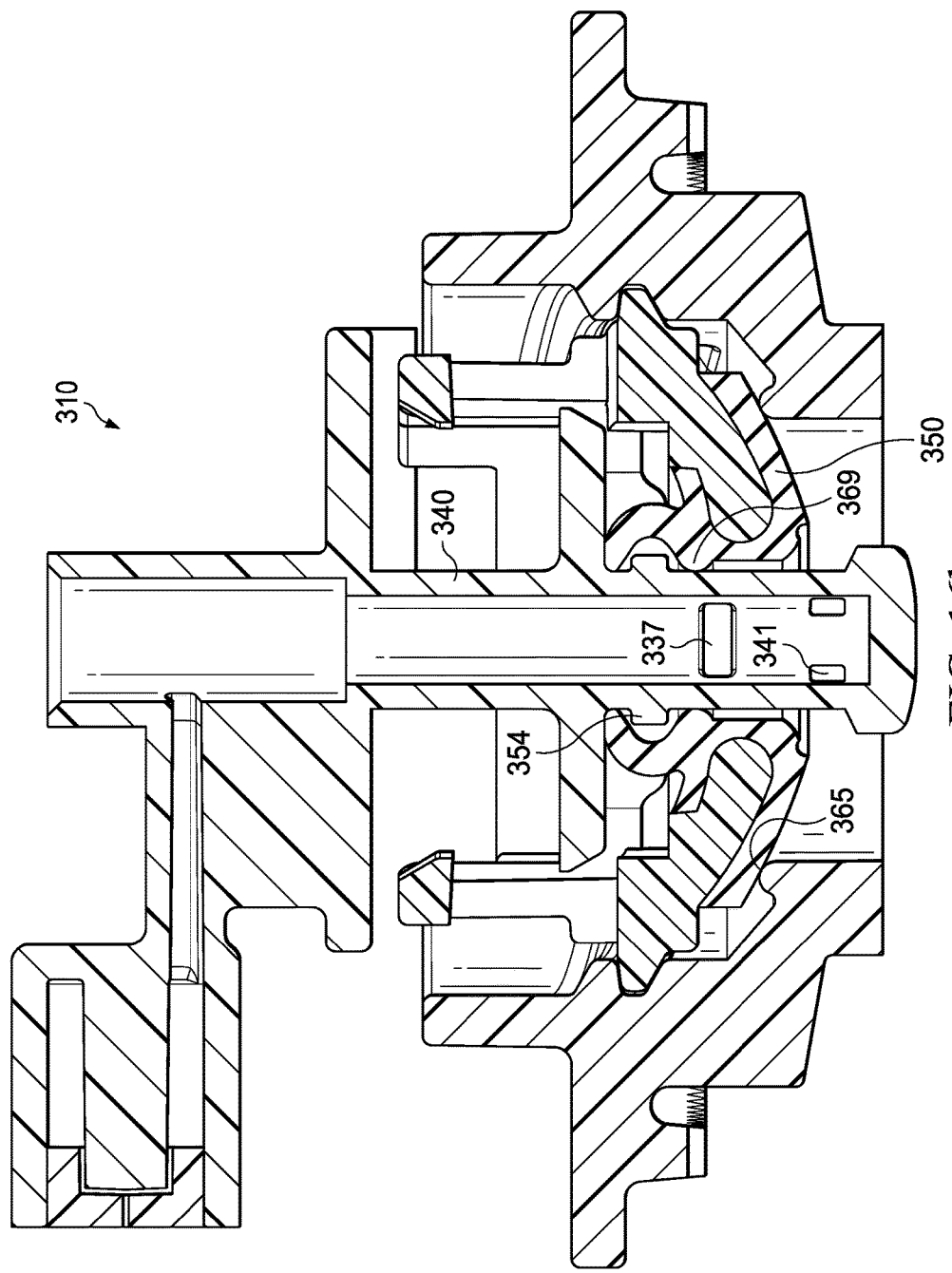
Figure 16C:
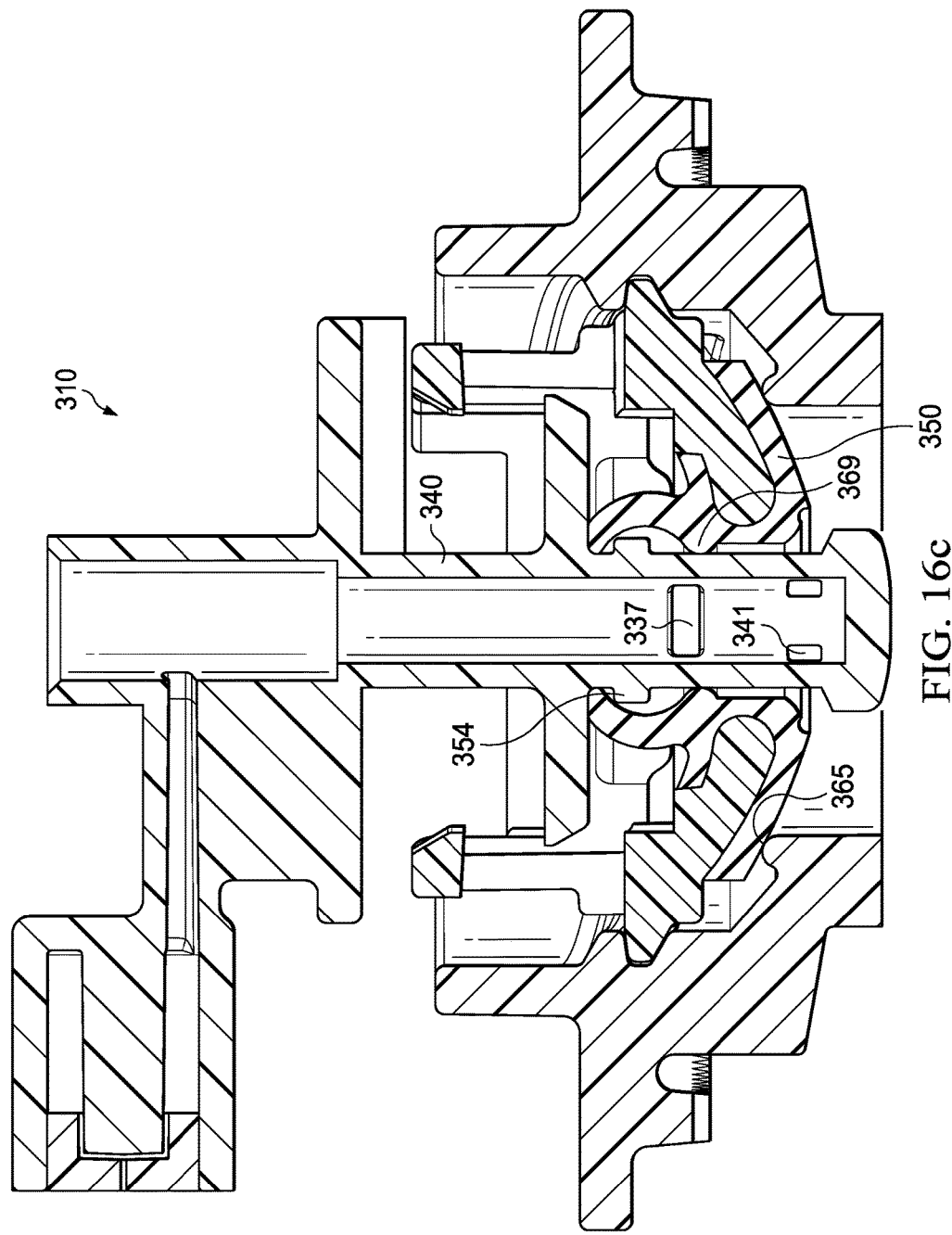

FIGS. 16a, 16b and 16c illustrate the different orientations of the valve stem 340 for the valve assembly 310 shown in FIG. 14, while the valve assembly 310 is at rest (FIG. 16a), during filling operation (FIG. 16b) and during product dispensing by the consumer (FIG. 16c). As shown in FIG. 16a, at rest, the spring portion 354 of the grommet 350 causes the valve stem 340 to retract so that the primary sealing portion 363 and the secondary sealing portion 369 of the grommet 350 align with the primary radial opening 341 and the secondary radial opening 337, respectively, in the valve stem 340. For the valve assembly 310 shown in FIG. 16b, the valve stem 340 is compressed vertically against the spring portion 354 of the grommet 350 exposing both the primary radial opening 341 and the secondary radial opening 337 to product in order provide maximum flow during product filling through the valve stem opening 342. For the valve assembly 310 shown in FIG. 16c, the valve stem 340 is depressed vertically exposing only the primary radial opening 341 in order to limit and/or control the amount of product dispensed by the consumer.

Figure 17:
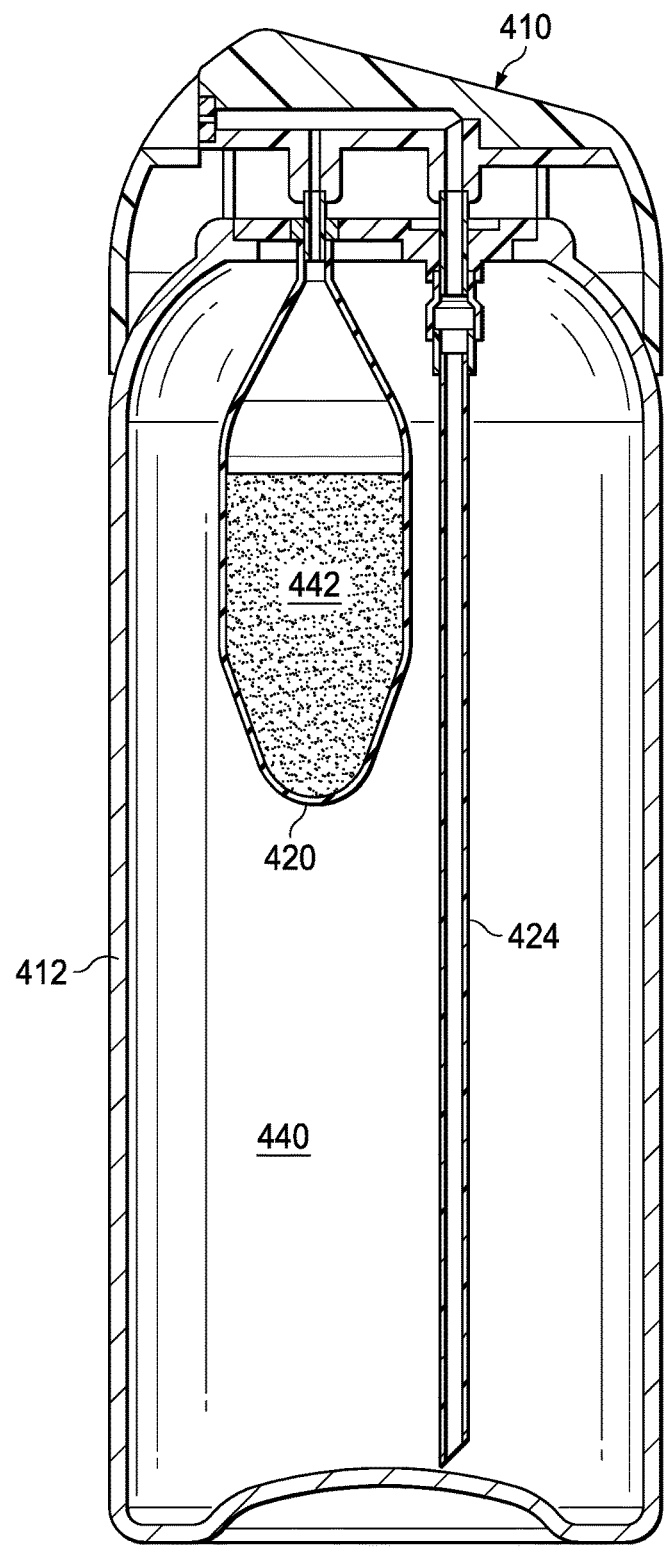
FIG. 17 is a schematic view of an aerosol container having a plurality of compressible valve assemblies of this invention.

The valve assembly according to the present invention can be used with an aerosol container 412 having a plurality valves as shown in FIG. 17. The arrangement shown provides the benefit that product 442 in collapsible bag 420 and propellant 440 are mixed at the point of use via dip tube 424 and valve assembly 410, allowing synergistic results between incompatible materials. This arrangement also provides the benefit that delivery of the propellant 440 provides more motive force to the product 442, often resulting in smaller particle size distribution. Smaller particle size distributions can be advantageous for uniform product distribution and minimizing undue wetting.

This arrangement provides the additional benefit that relative proportions of different materials may be tuned to a particular ratio for dispensing. For example, a product 442 may be dispensed and having a 3:5:1 ratio of a first component to a second component. While FIG. 17 illustrates an aerosol container 412 having two valve assemblies, one of skill in the art will recognize the invention is not so limited. The aerosol dispenser may have three, four or more valve assemblies with a like number of or lesser number of chambers to isolate different product materials until the point of use.

Regarding all numerical ranges disclosed herein, it should be understood that every maximum numerical limitation given throughout this specification includes every lower numerical limitation, as if such lower numerical limitations were expressly written herein. In addition, every minimum numerical limitation given throughout this specification will include every higher numerical limitation, as if such higher numerical limitations were expressly written herein. Further, every numerical range given throughout this specification will include every narrower numerical range that falls within such broader numerical range and will also encompass each individual number within the numerical range, as if such narrower numerical ranges and individual numbers were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A valve stem for a pressurized valve assembly, the valve stem comprising:
   a. an open top portion,
   b. a closed bottom portion,
   c. at least one primary radial opening disposed proximate to the closed bottom portion;
   d. at least one secondary radial opening disposed above the at least one primary radial opening;
   e. a valve stem longitudinal passageway between the open top portion and the at least one primary radial opening;
   f. a primary flange extending transversely away from the longitudinal passageway;
   g. a secondary flange disposed between the primary flange and the at least one secondary radial opening; and
   h. a conduit extends from the valve stem at an angle relative to the valve stem longitudinal passageway and proximate to the open top portion, wherein the conduit provides a flow path between the valve stem longitudinal passageway at a conduit first end and a dispensing opening at a conduit second end;
   i. wherein the primary flange is disposed between the open top portion and the secondary flange of the valve stem,
   j. a third annular flange around said valve stem positioned between said bottom portion and said at least one secondary radial opening;
   k. wherein said third annular flange is positioned intermediate between the at least one secondary radial opening and the at least one primary radial opening; and
   l. wherein said at least one primary radial opening comprises more than one row of primary radial openings, and said third annular flange is positioned intermediate between said more than one rows of primary radial openings.

2. The valve stem for a pressurized valve assembly of claim 1 wherein the primary flange has a top side and a bottom side.

3. The valve stem for a pressurized valve assembly of claim 2 further comprising a positive stop between the open top portion of the valve stem and the primary flange.

4. The valve assembly of claim 1, wherein the at least one secondary radial opening is disposed proximate to the closed bottom portion and the at least one primary radial opening is disposed between the at least one secondary radial opening and the closed bottom portion, further comprising a grommet comprising a sealing portion having a sealing portion opening and a grommet longitudinal passageway, wherein the grommet longitudinal passageway seals the at least one secondary radial opening, when the valve stem is in a closed position and wherein longitudinal translation of the valve stem exposes the at least one primary radial opening or both the at least one primary radial opening and the at least one secondary radial opening to the pressurized container when the valve stem is in an open position.

5. The valve assembly of claim 4 wherein the grommet sealing portion includes a primary sealing portion and a secondary sealing portion that seal the at least one primary radial opening and the at least one secondary radial opening, respectively, when the valve stem is in a closed position.

6. The valve assembly of claim 5, further comprising a valve cup; wherein the pressurized container comprises a dispensing structure and wherein the grommet sealing portion includes a cylindrical clevis providing a seal between the dispensing structure and the valve cup.

7. The valve assembly of claim 6 wherein the dispensing structure comprises a collapsible bag, the collapsible bag having a neck with an open neck end coaxial with the bottle open end wherein the cylindrical clevis of the grommet provides a seal between the neck of the bag and the valve cup.

8. The valve assembly according to claim 7 wherein the valve cup is threaded to the open neck end of the collapsible bag.

9. The valve assembly according to claim 7 wherein the cylindrical clevis of the grommet provides a seal between the open top portion of the dip tube housing and the valve cup.

10. A pressurized valve assembly for a pressurized container, the pressurized container having an open end with the valve assembly disposed inside the open end, the valve assembly comprising a valve stem the valve stem comprising:
   a. an open top portion,
   b. a closed bottom portion,
   c. at least one primary radial opening disposed proximate to the closed bottom portion;
   d. at least one secondary radial opening disposed above the at least one primary radial opening;
   e. a valve stem longitudinal passageway between the open top portion and the closed bottom portion;
   f. a primary flange extending transversely away from the longitudinal passageway;
   g. a secondary flange disposed between the primary flange and the at least one secondary radial opening; and
   h. a conduit extends from the valve stem at an angle relative to the valve stem longitudinal passageway and proximate to the open top portion, wherein the conduit provides a flow path between the valve stem longitudinal passageway at a conduit first end and a dispensing opening at a conduit second end;
   i. wherein the primary flange is disposed between the open top portion and the secondary flange of the valve stem,
   said valve assembly further comprising a mechanical seal having an upper opening and a lower opening and a mechanical seal longitudinal passageway therebetween, the mechanical seal longitudinal passageway has an internal diameter and is coaxial with the open end of the pressurized container, wherein the valve stem is disposed in the mechanical seal longitudinal passageway, wherein the closed bottom portion of the valve stem is in contact with the mechanical seal longitudinal passageway near the lower opening of the mechanical seal such that the mechanical seal seals the at least one primary radial opening when the valve stem is in a closed position and wherein longitudinal translation of the valve stem exposes the at least one primary radial opening to the pressurized container when the valve stem is in an open position, the valve assembly further comprising a valve cup disposed inside the open end of the pressurized container, the valve cup having an open top portion, a bottom portion with an opening therein and a longitudinal passageway between the open top portion and the bottom portion opening, the pressurized container further comprising an actuator disposed on the open top portion of the valve stem, the actuator including a plug portion sealing the open top portion of the valve stem, wherein depressing the actuator longitudinally translates the valve stem exposing the at least one primary opening to the pressurized container when the valve stem is in an open position, wherein the actuator includes a stop that interface with the top of the valve cup restricting the vertical travel of the valve stem so the secondary radial opening is not exposed when the actuator is pressed during dispensing.

11. The pressurized valve assembly of claim 10, wherein the open top portion of the valve cup includes diametrically opposed slots and diametrically opposed tabs that interface with the positive stop of the valve stem.

12. The valve assembly according to claim 10 wherein the mechanical seal comprises a grommet comprising a sealing portion having a sealing portion opening and a grommet longitudinal passageway, the grommet longitudinal passageway has an internal diameter and is coaxial with the open end of the pressurized container, the grommet sealing portion seals the at least one primary radial opening when the valve stem is in a closed position.

13. The valve assembly according to claim 12 wherein the grommet includes a spring portion integral with the sealing portion and includes a spring portion opening longitudinally opposed to the sealing portion opening.

14. The valve assembly according to claim 13 wherein the bottom side of the primary flange is in compressible contacting relationship with the grommet spring portion, wherein longitudinal translation of the valve stem primary flange results in equivalent longitudinal deflection of the spring portion exposing the at least one primary radial opening to the pressurized container when the valve stem is in an open position.

15. The valve assembly according to claim 14, wherein the grommet sealing portion is joined to the valve cup bottom portion.

* * * * *